(12) United States Patent
Iwamura

(10) Patent No.: US 12,066,814 B2
(45) Date of Patent: Aug. 20, 2024

(54) INFORMATION PROCESSING DEVICE, INFORMATION PROCESSING METHOD, AND NON-TRANSITORY COMPUTER READABLE MEDIUM

(71) Applicant: OMRON Corporation, Kyoto (JP)

(72) Inventor: Shintaro Iwamura, Otsu (JP)

(73) Assignee: OMRON Corporation, Kyoto (JP)

( * ) Notice: Subject to any disclaimer, the term of this patent is extended or adjusted under 35 U.S.C. 154(b) by 290 days.

(21) Appl. No.: 17/437,405

(22) PCT Filed: Feb. 12, 2020

(86) PCT No.: PCT/JP2020/005274
§ 371 (c)(1),
(2) Date: Sep. 8, 2021

(87) PCT Pub. No.: WO2020/195266
PCT Pub. Date: Oct. 1, 2020

(65) Prior Publication Data
US 2022/0171372 A1 Jun. 2, 2022

(30) Foreign Application Priority Data

Mar. 22, 2019 (JP) .................................. 2019-055404

(51) Int. Cl.
*G05B 19/418* (2006.01)
*G05B 19/05* (2006.01)

(52) U.S. Cl.
CPC ..... *G05B 19/41845* (2013.01); *G05B 19/058* (2013.01); *G05B 2219/23258* (2013.01); *G05B 2219/25067* (2013.01)

(58) Field of Classification Search
CPC ............ G05B 19/41845; G05B 19/058; G05B 2219/23258; G05B 2219/25067;
(Continued)

(56) References Cited

U.S. PATENT DOCUMENTS 6,191,708 B1 * 2/2001 Davidson ............... G08G 1/123
  455/500
7,092,815 B2 * 8/2006 Dort ................. G08G 1/096725
  340/919

(Continued)

FOREIGN PATENT DOCUMENTS

CN 105573236 5/2016
CN 107111650 8/2017
(Continued)

OTHER PUBLICATIONS

"Search Report of Europe Counterpart Application", issued on Nov. 15, 2022, p. 1-p. 8.
(Continued)

*Primary Examiner* — Ramesh B Patel
(74) *Attorney, Agent, or Firm* — JCIPRNET

(57) ABSTRACT

When a first reference item is selected, an information processing device duplicates a second reference item associated with a second setting screen belonging to another setting category related to a component, which is a setting target of a first setting screen associated with the first reference item, and duplicates a third reference item associated with a third setting screen, of which a setting target is another component electrically or mechanically connected to the component being the setting target of the first setting screen. The information processing device duplicates and collectively displays one or multiple reference items including at least one of the second reference item and the third reference item.

7 Claims, 17 Drawing Sheets

(58) Field of Classification Search
CPC .... G05B 19/056; G05B 19/409; B25J 9/1656; G06F 9/451; G06F 3/0481; G06Q 10/06; G06Q 10/00; G06Q 50/04; Y02P 90/30
See application file for complete search history.

(56) References Cited

U.S. PATENT DOCUMENTS

| | | | | |
|---|---|---|---|---|
| 8,060,862 | B2* | 11/2011 | Eldridge | G06F 8/71 717/121 |
| 8,305,626 | B2* | 11/2012 | Takei | G06F 3/1204 358/1.16 |
| 8,788,668 | B2* | 7/2014 | Takemura | G06F 9/5061 709/226 |
| 9,417,626 | B2* | 8/2016 | Jones | G05B 19/41865 |
| 9,454,526 | B1* | 9/2016 | Kapoor | G06F 21/32 |
| 10,384,349 | B2* | 8/2019 | Yoshida | B25J 9/1692 |
| 11,409,256 | B2* | 8/2022 | Sakuma | G06F 8/313 |
| 2002/0054149 | A1* | 5/2002 | Genise | G05B 19/0426 715/810 |
| 2002/0080891 | A1* | 6/2002 | Ahn | H03F 1/3247 375/297 |
| 2004/0073404 | A1* | 4/2004 | Brooks | G05B 19/409 702/183 |
| 2005/0144271 | A1* | 6/2005 | Shirane | H04L 41/0883 714/4.1 |
| 2006/0238786 | A1* | 10/2006 | Sakura | G06F 3/1205 358/1.9 |
| 2008/0104212 | A1* | 5/2008 | Ebrom | G06Q 10/06 714/E11.202 |
| 2010/0097654 | A1* | 4/2010 | Takei | G06F 3/1257 358/1.16 |
| 2011/0087977 | A1* | 4/2011 | Campney | G05B 19/0426 715/763 |
| 2014/0100668 | A1* | 4/2014 | Jundt | G05B 19/4188 700/11 |
| 2015/0105878 | A1* | 4/2015 | Jones | G05B 19/4188 700/83 |
| 2016/0132047 | A1* | 5/2016 | Kambe | G05B 19/0426 700/86 |
| 2016/0332297 | A1* | 11/2016 | Sugaya | B25J 9/161 |
| 2017/0330153 | A1* | 11/2017 | Muhammedali | H04L 67/306 |
| 2020/0050709 | A1* | 2/2020 | Oguri | G06F 30/00 |
| 2023/0359714 | A1* | 11/2023 | Cristache | G06F 3/04842 |

FOREIGN PATENT DOCUMENTS

| | | |
|---|---|---|
| CN | 107533323 | 1/2018 |
| JP | 2001051945 | 2/2001 |
| JP | 2002082715 | 3/2002 |
| JP | 2005327237 | 11/2005 |
| JP | 2006309350 | 11/2006 |
| JP | 2013137839 | 7/2013 |
| JP | 2016091066 | 5/2016 |
| JP | 2016115358 | 6/2016 |

OTHER PUBLICATIONS

"International Search Report (Form PCT/ISA/210) of PCT/JP2020/005274," mailed on May 19, 2020, with English translation thereof, pp. 1-4.

"Written Opinion of the International Searching Authority (Form PCT/ISA/237) of PCT/JP2020/005274," mailed on May 19, 2020, with English translation thereof, pp. 1-6.

"Office Action of China Counterpart Application", issued on Sep. 6, 2023, with English translation thereof, p. 1-p. 13.

* cited by examiner

INFORMATION PROCESSING DEVICE, INFORMATION PROCESSING METHOD, AND NON-TRANSITORY COMPUTER READABLE MEDIUM

CROSS-REFERENCE TO RELATED APPLICATION

This application is a 371 application of the International PCT application serial no. PCT/JP2020/005274, filed on Feb. 12, 2020, which claims the priority benefit of Japan Patent Application No. 2019-055404, filed on Mar. 22, 2019. The entirety of each of the above-mentioned patent applications is hereby incorporated by reference herein and made a part of this specification.

TECHNICAL FIELD

The present disclosure is related to a technique for displaying a setting screen of a component included in a control system.

RELATED ART

Factory automation (FA) control systems that automate production processes are popular at production sites. A control system is composed of various industrial components. The components include, for example, a moving table for moving a workpiece, or a conveyor for conveying a workpiece, or an arm robot for moving a workpiece to a predetermined destination. These components are controlled by a programmable logic controller (PLC) or a robot controller or the like.

An information processing device (for example, a personal computer (PC)) connected to the PLC receives a user's operation, and builds and sets up a control system including one or multiple components. The information processing device, for example, displays a setting screen selected by a user's operation and receives settings.

As one example of a technique for building the control system in the information processing device, Japanese Laid-Open No. 2016-091066 (Patent Document 1) discloses "a support device searches, among group names of which data are classified and hierarchically managed, for a search group name matching an input character, and displays the search group name together with the name of a parent group of the group with the search group name."

PRIOR-ART DOCUMENTS

Patent Documents

Patent Document 1: Japanese Laid-open No. 2016-091066

SUMMARY OF THE INVENTION

Problems to be Solved by the Invention

By the way, as the number of components included in the control system increases, connection relationships or correspondences of settings between the components become complex. For that reason, in the information processing device, when a user's selection of a component is received, it takes time to extract the settings related to the settings for each setting category in at least one of the selected component and another component related to the selected component.

The present disclosure has been devised in view of such circumstances, and discloses a technique capable of easily extracting the settings related to the settings for each setting category in at least one of a selected component and another component related to the selected component.

Means for Solving the Problems

In one example of the present disclosure, provided is an information processing device for building and setting up a control system including one or multiple components. The information processing device include: a reception part, receiving a designation of one or multiple components included in the control system as a target as well as an electrical or mechanical connection relationship between the components; a setting screen processing part, selectively displaying a setting screen prepared by component and by setting category for receiving settings for each component included in the control system built according to the designation; a reference item processing part, displaying multiple reference items associated with any of the setting screen and for selectively displaying the associated setting screen according to user settings; and a collective processing part, duplicating and collectively displaying one or multiple reference items when a first reference item among the multiple reference items is selected. The duplicated and collectively displayed one or multiple reference items include at least one of a second reference item associated with a second setting screen belonging to another setting category related to the component to be set by a first setting screen associated with the selected first reference item, and a third reference item associated with a third setting screen for setting another component electrically or mechanically connected to the component to be set by the first setting screen associated with the selected first reference item.

According to this disclosure, in the information processing device, another reference item related to a certain reference item can be easily extracted.

In one example of the present disclosure, the multiple reference items are arranged by setting category to which the setting screen associated with each reference item belongs.

According to this disclosure, in the information processing device, by arranging the reference items by setting category, the reference items of the same type can be displayed together in one setting category.

In one example of the present disclosure, the collective processing part duplicates and collectively displays the reference items associated with the setting screen belonging to the another setting category related to the another component.

According to this disclosure, in the information processing device, all the reference items related to a selected reference item can be duplicated without omission.

In one example of the present disclosure, the collective processing part duplicates and collectively displays the reference items associated with the setting screen belonging to another setting category associated with the same device as that associated with a setting category including the selected first reference item.

According to this disclosure, in the information processing device, only a setting category including a reference item related to the selected reference item can be taken as a target for extracting the reference item, and extraction time can be further shortened.

In one example of the present disclosure, based on another set value set on the same setting screen as a set value set on the setting screen associated with the selected reference item, the collective processing part duplicates and collectively displays the reference items associated with another setting screen where the another set value is set.

According to this disclosure, in the information processing device, only a reference item relevant to the selected reference item can be extracted.

In one example of the present disclosure, provided is an information processing method for building and setting up a control system including one or multiple components. The information processing method includes the following steps. A designation of one or multiple components included in the control system as a target as well as an electrical or mechanical connection relationship between the components is received. A setting screen prepared by component and by setting category for receiving settings for each component included in the control system built according to the designation is selectively displayed. Multiple reference items associated with any of the setting screen and for selectively displaying the associated setting screen according to user settings are displayed. One or multiple reference items are duplicated and collectively displayed when a first reference item among the multiple reference items is selected. The duplicated and collectively displayed one or multiple reference items include at least one of a second reference item associated with a second setting screen belonging to another setting category related to the component to be set by a first setting screen associated with the selected first reference item, and a third reference item associated with a third setting screen for setting another component electrically or mechanically connected to the component to be set by the first setting screen associated with the selected first reference item.

According to this disclosure, in the information processing method, another reference item related to a certain reference item can be easily extracted.

In one example of the present disclosure, provided is an information processing program that causes a computer to function as an information processing device and build and set up a control system including one or multiple components. The information processing program causes the computer to execute the following steps. A designation of one or multiple components included in the control system as a target as well as an electrical or mechanical connection relationship between the components is received. A setting screen prepared by component and by setting category for receiving settings for each component included in the control system built according to the designation is selectively displayed. Multiple reference items associated with any of the setting screen and for selectively displaying the associated setting screen according to user settings are displayed. One or multiple reference items are duplicated and collectively displayed when a first reference item among the multiple reference items is selected. The duplicated and collectively displayed one or multiple reference items include at least one of a second reference item associated with a second setting screen belonging to another setting category related to the component to be set by a first setting screen associated with the selected first reference item, and a third reference item associated with a third setting screen for setting another component electrically or mechanically connected to the component to be set by the first setting screen associated with the selected first reference item.

According to this disclosure, in the information processing program, another reference item related to a certain reference item can be easily extracted.

Effects of the Invention

According to the present disclosure, in an aspect, settings related to those for each setting category in at least one of a selected component and another component related to the selected component can be easily extracted.

BRIEF DESCRIPTION OF THE DRAWINGS

FIG. 14 shows a correspondence between setting categories and reference items included in an MVE 20 and a code 20a.

FIG. 15 is an enlarged view showing the content of the code 20a.

DESCRIPTION OF THE EMBODIMENTS

Figure 1:
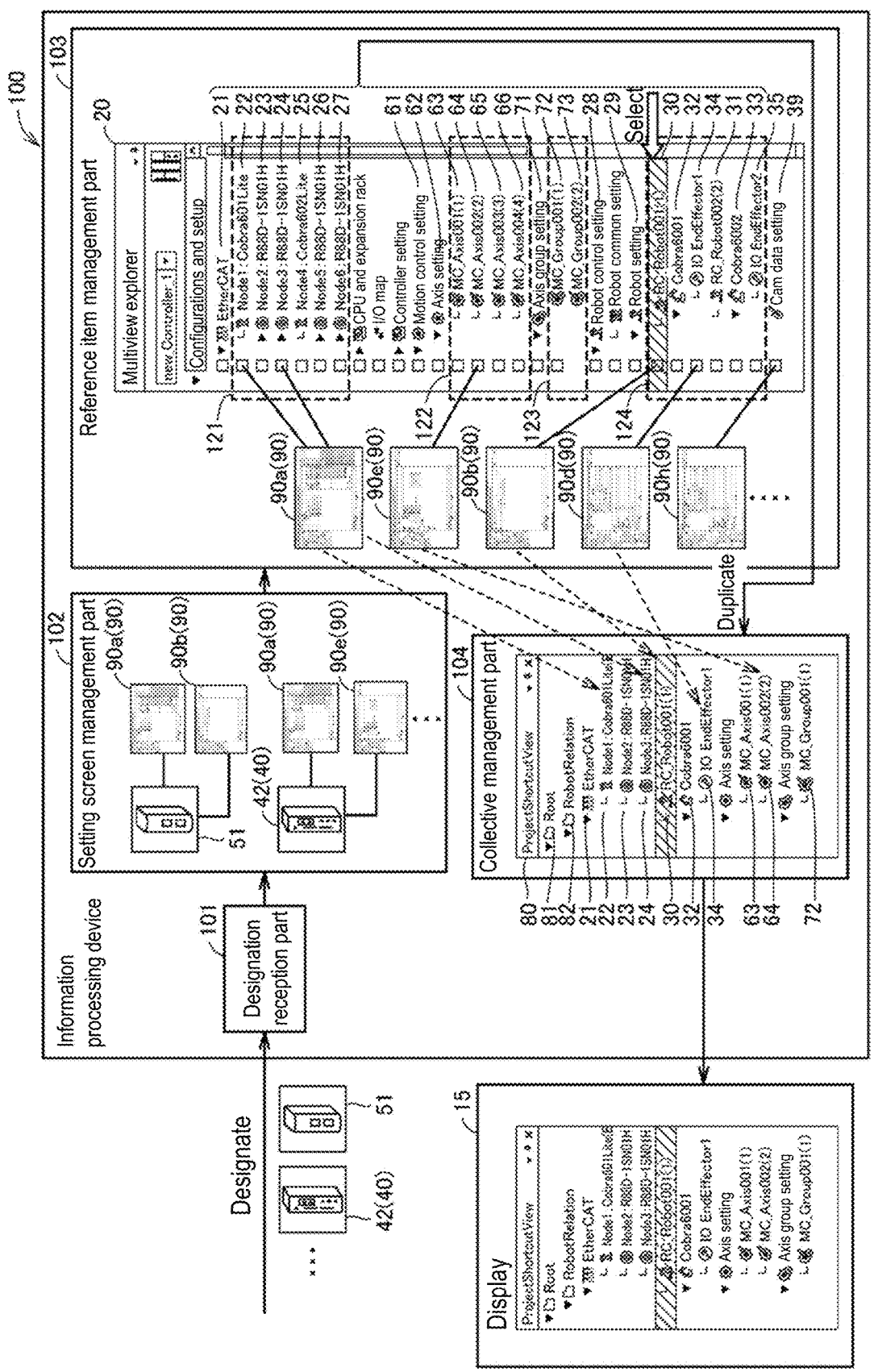
FIG. 1 describes a configuration example of an information processing device 100.

An embodiment of the present invention is hereinafter described with reference to the drawings. In the following description, the same parts are denoted by the same reference numerals, and they also have the same names and functions. Therefore, a detailed description thereof will not be repeated.

Application Example

Figure 2:
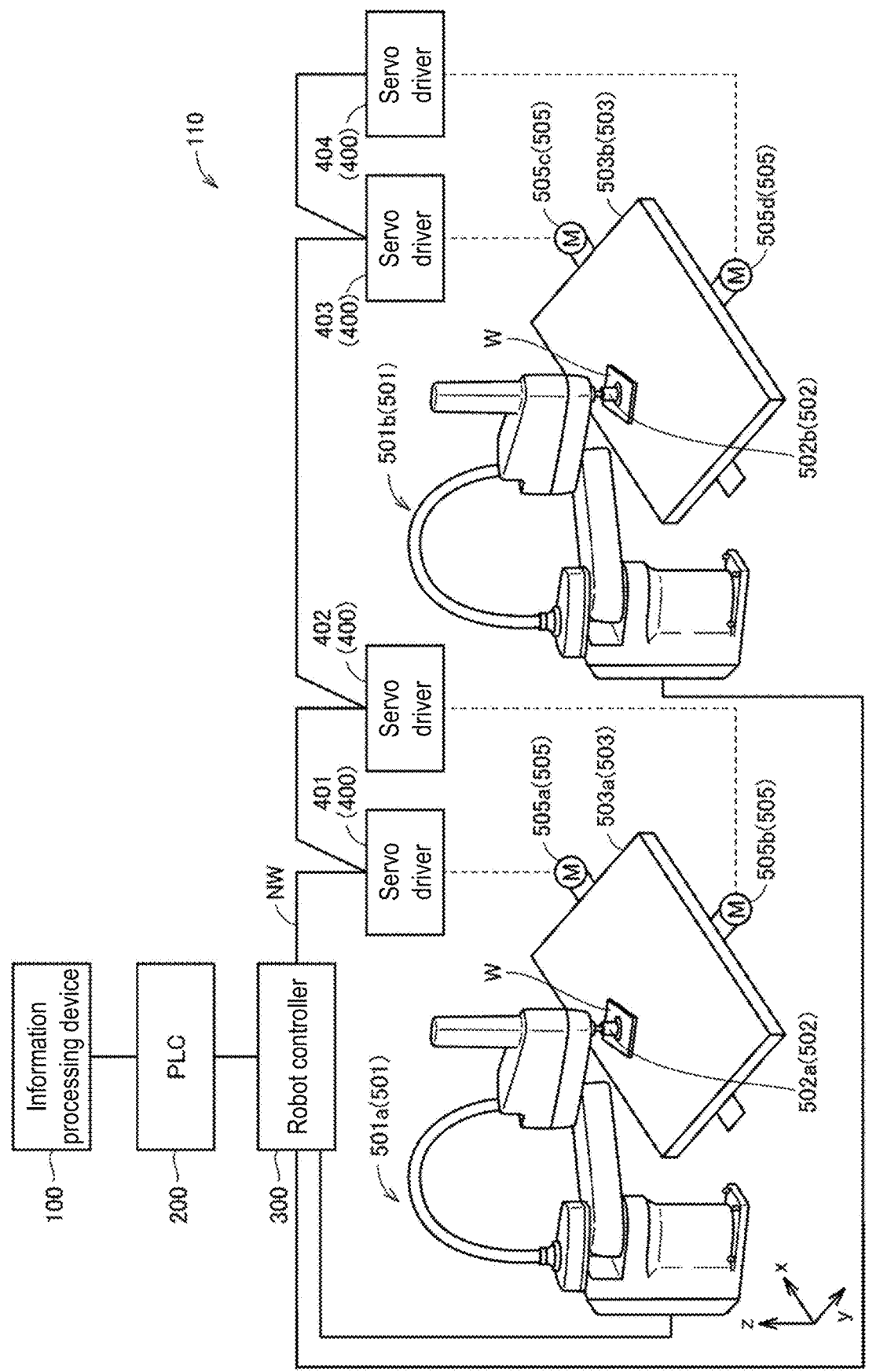
FIG. 2 illustrates an electrical or mechanical connection between components in a control system 110.
Figure 3:
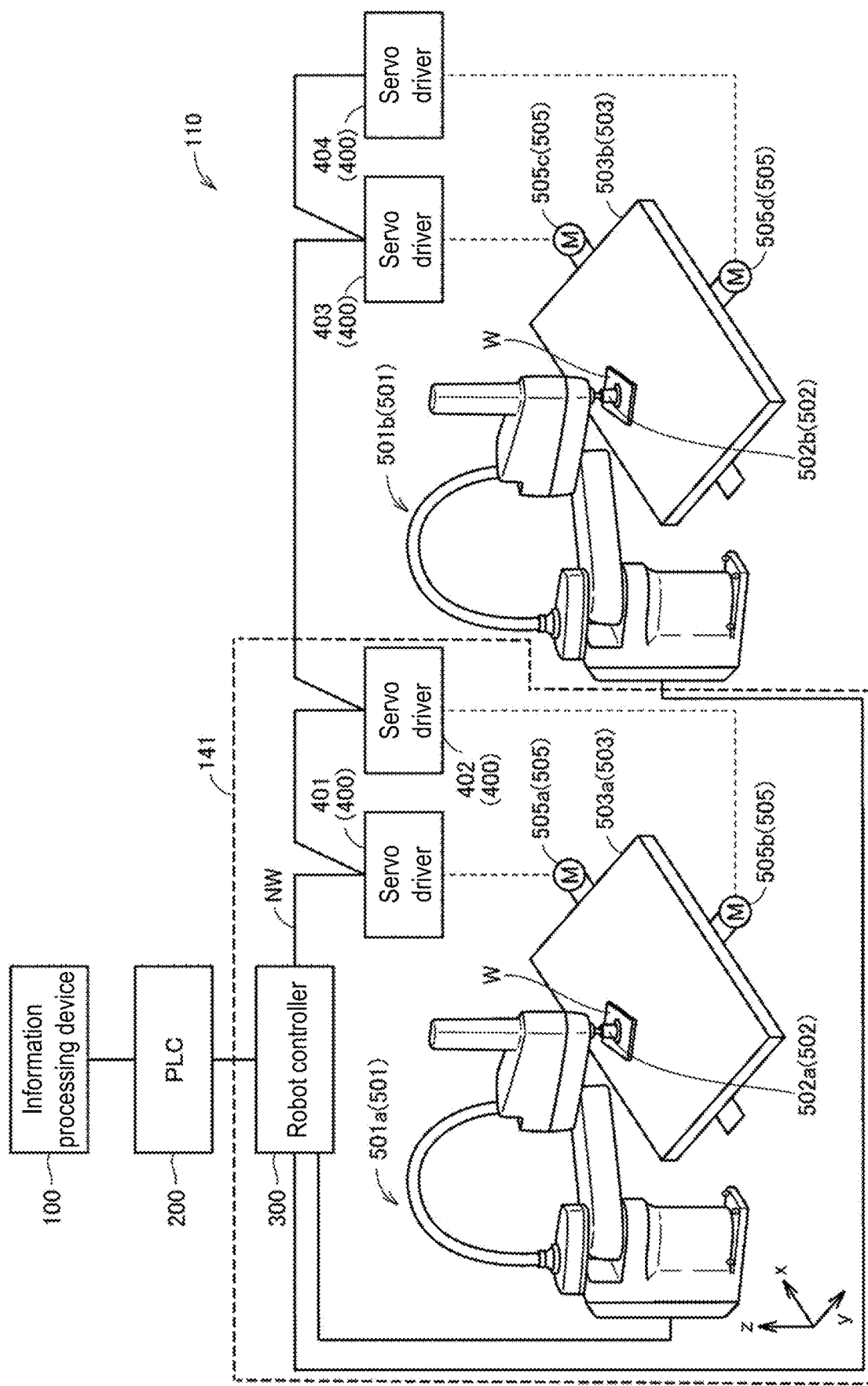
FIG. 3 shows components corresponding to relevant reference items.

Referring to FIG. 1 to FIG. 3, an application example of the present invention is described. FIG. 1 describes a configuration example of the information processing device 100. In the present embodiment, the information processing device 100 builds and sets up a control system including one or multiple components. The information processing device 100 includes a designation reception part 101, a setting screen management part 102, a reference item management part 103, and a collective management part 104. The information processing device 100 realizes these functions by a later-described processor (for example, processor 2 shown in FIG. 4) executing a later-described control program (for example, control program 9 shown in FIG. 4). The control program 9 is stored in advance in a later-described storage device (for example, storage device 5 shown in FIG. 4).

The designation reception part 101 receives a designation of one or multiple components included in the control system as well as an electrical or mechanical connection relationship between the components by a user's operation.

FIG. 2 illustrates an electrical or mechanical connection between components in the control system 110. Referring to FIG. 2, the controller system 110 includes the information processing device 100, a programmable logic controller (PLC) 200 being one example of a controller, a robot controller 300 controlling a robot 501, and servo drivers 401, 402, 403, and 404. The information processing device 100 includes a terminal device such as a personal computer (PC) or a tablet terminal. The servo drivers 401, 402, 403, and 404 (hereinafter also collectively referred to as "servo driver 400") drive their corresponding servomotors 505*a*, 505*b*, 505*c*, and 505*d* (hereinafter also collectively referred to as "servomotor 505").

At a production site, the control system 110 may be built as a system in which real machines corresponding to the components are combined. The information processing device 100 may receive a designation of a connection relationship between the components in the control system 110 built by real machines. The information processing device 100 may also receive a designation of a connection relationship between the components in a state in which a configuration of the control system 110 is not built by real machines. The following describes, as one example, each processing including the connection relationship or the like on the premise that the configuration of the control system 110 is not built by real machines.

The PLC 200 executes a designed program, and, according to an execution result, gives a target value to the robot controller 300 or the servo driver 400 respectively, thereby controlling a target including robots 501*a* and 501*b* (hereinafter also collectively referred to as "robot 501"), end effectors 502*a* and 502*b* (hereinafter also collectively referred to as "end effector 502") provided on the robot 501, and stages 503*a* and 503*b* (hereinafter also collectively referred to as "stage 503").

The robot controller 300 and the servo driver 400 are connected to the PLC 200. The PLC 200, the robot controller 300 and the servo driver 400 are connected by a daisy chain via a network NW. For the network NW, EtherCAT®, for example, is adopted. However, the network NW is not limited to EtherCAT, and any communication means may be adopted. The connection mode is not limited to the daisy chain, and may be other connection mode such as tree connection or star connection.

The robot 501 and the stage 503 move a workpiece W in cooperation with each other. The cooperation between the robot 501 and the stage 503 is not limited to movement of the workpiece W. The cooperation between the robot 501 and the stage 503 may also be, for example, processing of the workpiece W by the robot 501 on the stage 503.

By driving of the robot 501, the stage 503 changes behavior in a three-dimensional space defined by an X-axis, a Y-axis and a Z-axis orthogonal to each other. By driving of the stage 503, the behavior of the stage 503 is defined in the same three-dimensional space as the robot controller 300, especially in a plane defined by the X-axis and the Y-axis.

The robot controller 300 drives a servomotor (not shown) of the robot 501 and a servomotor (not shown) of the end effector 502. An encoder (not shown) is disposed on a rotary shaft of the servomotor. The encoder outputs, as a feedback value of the servomotor, position (rotation angle), rotational speed, cumulative number of revolutions or the like of the servomotor, to the robot controller 300.

Similarly, the servo driver 400 drives the servomotor 505 of the stage 503. An encoder (not shown) is disposed on a rotary shaft of the servomotor 505. The encoder outputs, as a feedback value of the servomotor 505, position (rotation angle), rotational speed, cumulative number of revolutions or the like of the servomotor, to the servo driver 400.

Figure 4:
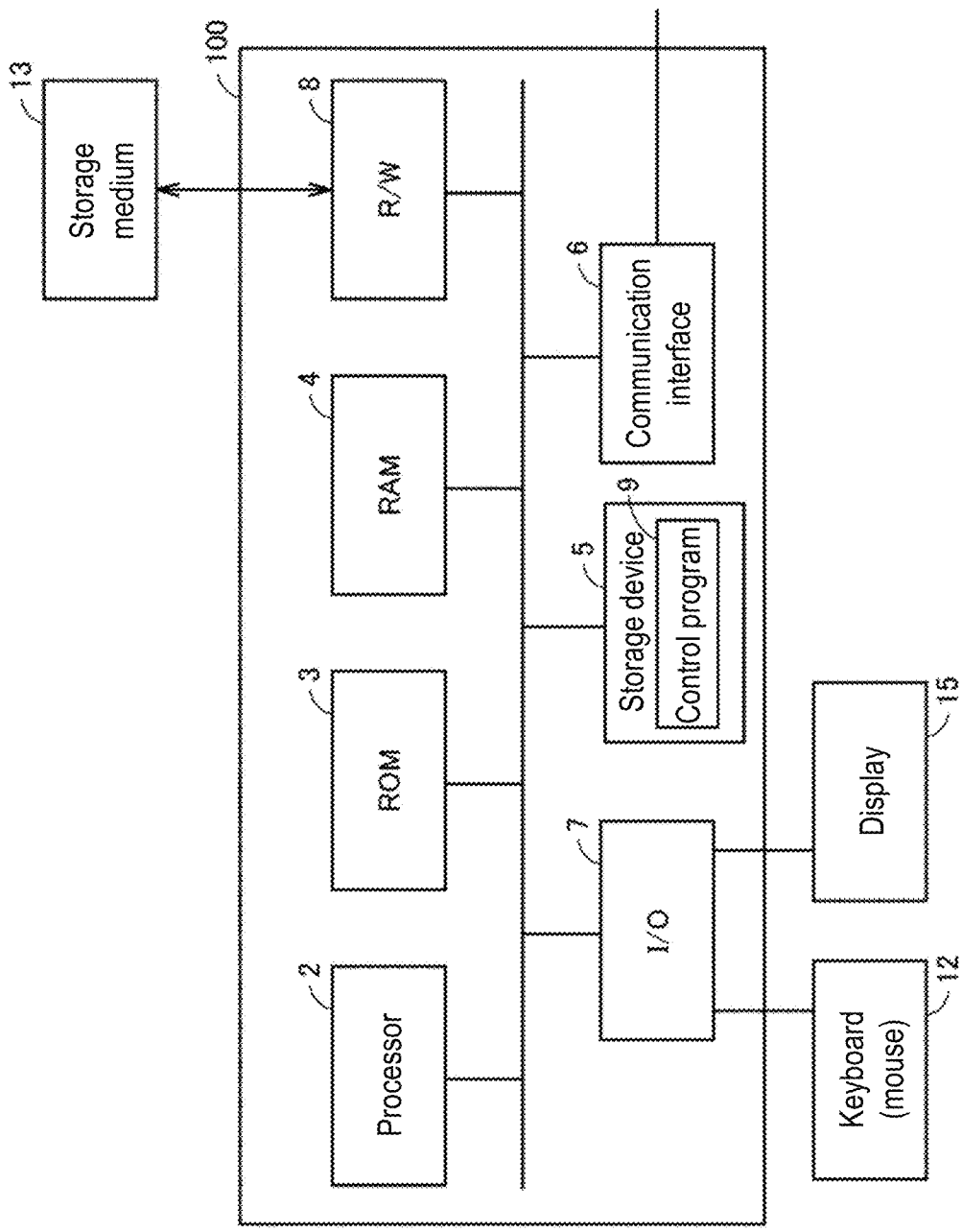
FIG. 4 illustrates a hardware configuration of the information processing device 100.

Referring again to FIG. 1, the designation reception part 101 of the information processing device 100 receives a designation of a component by a user's operation on the information processing device 100 using a keyboard (for example, keyboard 12 shown in FIG. 4). More specifically, the information processing device 100 receives, for example, a designation of a component including the PLC 200, the robot controller 300, the servo driver 400, the robot 501 and the end effector 502 as well as an electrical or mechanical connection relationship between these components. The received connection relationship is displayed on a setting screen (for example, network setting screen 90*a* shown in FIG. 1).

The designation reception part 101 receives, for example, a designation of a robot component 51 corresponding to the robot 501*a* and a driver component 42 corresponding to the servo driver 402 by a user's operation. More specifically, as shown on the network setting screen 90*a* shown in FIG. 5 to be described later, the robot component 51 and a robot component 52, and a driver component 41 to a driver component 44 are designated by a user's operation. The designation reception part 101 outputs the received designation to the setting screen management part 102.

The setting screen management part 102, for example, displays the network setting screen 90*a* included in the first display screen 111. In the following, the network setting screen 90*a* and other setting screens (for example, robot details setting screen 90*c* and axis setting screen 90*e*) are also collectively referred to as "setting screen 90." The setting screen management part 102 selectively displays the setting screen 90 prepared by component and by setting category for receiving settings for each component included in the control system 110 built according to the designation.

The setting screen management part 102, for example, displays the network setting screen 90*a* and the robot setting screen 90*b* in association with the robot component 51 corresponding to the robot 501*a* shown in FIG. 2. The setting screen management part 102, for example, displays the network setting screen 90*a* and the axis setting screen 90*e* in association with the driver component 42 corresponding to the servo driver 402 shown in FIG. 2. The reason that multiple setting screens are associated with each component in this way is because the robot 501*a* and the servo driver 402 are provided in the same network NW and have a setting screen (for example, network setting screen 90*a*) for setting a node address. In addition to setting of node address, the reason that a setting screen is associated with each component is because there are setting screens for setting each component itself. For example, the network setting screen 90*a* is a node address setting screen. In contrast, the robot setting screen 90*b* and the axis setting screen 90*e* are setting screens for setting the components themselves.

Next, the reference item management part 103 displays multiple reference items associated with any of the setting screen 90 and for selectively displaying the associated setting screen 90 according to user settings.

The "reference item" is associated with a file containing a set value group related to the setting screen 90. The reference item also functions as a shortcut for the associated file. It is also possible to provide multiple reference items for the same file. The reference item is displayed on a later-described display (for example, display 15 shown in FIG. 4). When a designation to a certain reference item by a user's operation is received, the file is referred to, and the setting screen 90 is displayed on the display 15. The reference item may be displayed as an icon or an icon-like image object.

The reference item is included in any setting category among multiple setting categories. The setting category and the reference item associated with the setting category are included in a multiview explorer 20 (hereinafter "MVE 20"). More specifically, multiple setting categories are provided in the MVE 20 by setting category to which the setting screen 90 associated with each reference item belongs. In the information processing device 100, by providing the reference items by setting category, the reference items of the same type can be displayed together in one setting category.

The MVE 20 includes, for example, a network setting category 21, a motion control setting category 61, an axis setting category 62, an axis group setting category 71, a robot control setting category 28 and a robot setting category 29. Among these setting categories, for example, the network setting category 21 corresponds to "EtherCAT."

Each setting category includes, for example, multiple reference items. More specifically, the network setting category 21 includes a Node1 reference item 22 to a Node6 reference item 27. The axis setting category 62 in the motion control setting category 61 includes an Axis001 reference item 63 to an Axis004 reference item 66. The axis group setting category 71 in the motion control setting category 61 includes a Group001 reference item 72 and a Group002 reference item 73.

Further, the robot setting category 29 in the robot control setting category 28 includes a Robot001 reference item 30 and a Robot002 reference item 31, a Cobra6001 reference item 32 and a Cobra6002 reference item 33, and an EndEffector1 reference item 34 and an EndEffector2 reference item 35.

The reference item management part 103 associates the setting screen 90 generated by the setting screen management part 102 with the reference items in the setting categories. The reference item management part 103, for example, associates the network setting screen 90a with the Node1 reference item 22 or the Node3 reference item 24. The reference item management part 103, for example, associates the robot setting screen 90b with the Robot001 reference item 30. The reference item management part 103, for example, associates the end effector setting screen 90d with the EndEffector1 reference item 34. The reference item management part 103, for example, associates the axis setting screen 90e with the Axis002 reference item 64. In addition, the reference item management part 103, for example, associates a cam data setting screen 90h with a cam data setting reference item 39.

When any of the reference items that the reference management part 103 has made an association is selected, the collective management part 104 duplicates a reference item related to the selected reference item. Accordingly, multiple reference items can be provided for the same file. As described above, the reference item is selected by a user's operation using, for example, the keyboard 12.

The collective management part 104 duplicates, regarding a component to be set by a first setting screen associated with a selected first reference item, a second reference item associated with a second setting screen belonging to another setting category related to the component. More specifically, for example, in the case where the Robot001 reference item 30 is selected, the collective management part 104 duplicates a reference item of another setting category related to the robot component 51 to be set by the robot setting screen 90b associated with the selected reference item. The collective management part 104 duplicates, for example, the Node1 reference item 22 associated with the network setting screen 90a belonging to the network setting category 21.

The collective management part 104 duplicates a third reference item associated with a third setting screen for setting another component electrically or mechanically connected to the component to be set by the first setting screen associated with the selected first reference item. More specifically, for example, when the Robot001 reference item 30 is selected, the collective management part 104 duplicates a reference item associated with a setting screen for setting a component electrically or mechanically connected to the robot component 51 to be set by the robot setting screen 90b associated with the selected reference item. The collective management part 104 duplicates, for example, the EndEffector1 reference item 34 associated with a later-described setting screen for setting a component of the end effector 502a that is electrically or mechanically connected to the robot component 51. The setting screen is, for example, the end effector setting screen 90d.

The collective management part 104 duplicates and collectively displays one or multiple reference items among the reference items displayed in the MVE 20. The collective management part 104, for example, creates a RobotRelation folder 82 under a Root folder 81 in a project shortcut view 80 (hereinafter also "PSV 80"). The folder 82 is created by a user's operation using, for example, the keyboard 12. The collective management part 104 receives a user's operation and creates the RobotRelation folder 82. Each duplicated reference item is stored in the RobotRelation folder 82.

More specifically, the collective management part 104 duplicates a reference item in a first reference item group 121 that is related to the Robot001 reference item 30 being the selected first reference item. The first reference item group 121 includes the Node1 reference item 22 to the Node6 reference item 27. The collective management part 104 duplicates, for example, the Node1 reference item 22 to the Node3 reference item 24 in the first reference item group 121.

The collective management part 104 duplicates a reference item in a second reference item group 122 that is related to the Robot001 reference item 30. The second reference item group 122 includes the Axis001 reference item 63 to the Axis004 reference item 66. The collective management part 104 duplicates, for example, the Axis001 reference item 63 and the Axis002 reference item 64 in the second reference item group 122.

The collective management part 104 duplicates a reference item in a third reference item group 123 that is related to the Robot001 reference item 30. The third reference item group 123 includes the Group001 reference item 72 and the Group002 reference item 73. The collective management part 104 duplicates, for example, the Group001 reference item 72 in the third reference item group 123.

The collective management part 104 duplicates a reference item in a fourth reference item group 124 that is related to the Robot001 reference item 30. The fourth reference item group 124 includes the Robot001 reference item 30 and the Robot002 reference item 31, the Cobra6001 reference item 32 and the Cobra6002 reference item 33, and the EndEffector1 reference item 34 and the EndEffector2 reference item 35. The collective management part 104 duplicates, for example, the Robot001 reference item 30, the Cobra6001 reference item 32 and the EndEffector1 reference item 34 in the fourth reference item group 124. Accordingly, in the information processing device 100, another reference item related to a certain reference item can be easily extracted.

The collective management part 104 of the present embodiment does not duplicate the cam data setting reference item 39 associated with the cam data setting screen 90h. The cam data setting reference item 39 will not be a target to be duplicated since it does not correspond to any of the second reference item and the third reference item related to the Robot001 reference item 30. However, in the present embodiment, the case of not duplicating the cam data setting reference item 39 is an example for describing that a reference item among multiple reference items that is unrelated to a certain reference item will not be the target to be duplicated. Therefore, in the case where the cam data setting reference item 39 is related to the certain reference item, it is possible that the cam data setting reference item 39 is taken as the target to be duplicated. It is also possible that a different reference item unrelated to the certain reference item is not taken as the target to be duplicated.

When the above duplicated reference items are expressed from the viewpoint of components, the components shown in FIG. 3, for example, are the target. FIG. 3 shows components corresponding to relevant reference items. FIG. 3 shows the same configuration as that of FIG. 2 described above. Referring to FIG. 3, the target relevant components are the components included in a range 141. More specifically, since the Robot001 reference item 30 is selected, the target components include the robot 501a corresponding to the robot component 51 associated with the robot setting screen 90b of the reference item, and the robot controller 300, the servo driver 401, and the servo driver 402 that are connected to the robot 501a by the network NW. The target components also include the end effector 502a that is electrically or mechanically connected to the robot 501a.

Herein, the above duplication performed by the collective management part 104 includes duplication of a reference item associated with the setting screen 90 belonging to another setting category related to another component. More specifically, the collective management part 104 duplicates, for example, the Axis001 reference item 63 associated with the setting screen 90 of the driver component 41 corresponding to the servo driver 401 being another component connected to the robot 501a via the network NW. The Axis001 reference item 63 is a reference item belonging to a different setting category from that to which the Node2 reference item 23 associated with the network setting screen 90a belongs. The collective management part 104 duplicates, for example, the Axis002 reference item 64 associated with the axis setting screen 90e of the driver component 42 corresponding to the servo driver 402 connected to the robot 501a via the network NW. The Axis002 reference item 64 is a reference item belonging to a different setting category from that to which the Node3 reference item 24 associated with the network setting screen 90a belongs. Accordingly, in the information processing device 100, all the reference items related to a selected reference item can be duplicated without omission.

The collective management part 104 collectively displays multiple duplicated reference items on the display 15. In the case where the Robot001 reference item 30 is selected, reference items of components related to the other robots are not included in the target to be duplicated. For example, the servo driver 403 and the servo driver 404, which are connected to the robot 501b corresponding to the robot component 52 by the network NW but are not connected to the robot 501a by the network NW, are not included in the target to be duplicated. The end effector 502b, which is electrically or mechanically connected to the robot 501b but is not electrically or mechanically connected to the robot 501a, is not included in the target to be duplicated.

First Embodiment

[Hardware Configuration of Information Processing Device 100]

FIG. 4 illustrates a hardware configuration of the information processing device 100. The information processing device 100 performs, for example, a simulation of the control system 110 offline. The information processing device 100 is typically composed of a general-purpose computer. The information processing device 100 is, for example, a notebook-type personal computer having excellent portability. The information processing device 100 includes the processor 2, a read-only memory (ROM) 3 storing a BIOS or various data, a RAM 4, and a storage device 5.

The processor 2 reads the control program 9 stored in the storage device 5 and develops the control program 9 on the random access memory (RAM) 4. The processor 2 functions as the designation reception part 101, the setting screen management part 102, the reference item management part 103, and the collective management part 104. In the following, described is a configuration example in which necessary processing is realized by the processor 2 executing a program. Some or all of the processing provided may be implemented using a dedicated hardware circuit (for example, an ASIC or FPGA).

The storage device 5 stores a program or the like to be executed by the processor 2 in a nonvolatile manner. The storage device 5 is a nonvolatile device such as a hard disk and a solid state drive (SSD), and holds the control program 9 for realizing various functions executed by the processor 2.

The information processing device 100 further includes a communication interface 6, an input/output (I/O) interface 7, a reader/writer (R/W) device 8, the keyboard 12 and the display 15.

The communication interface 6 is an interface for the information processing device 100 to communicate with an external machine including the PLC 200.

The I/O interface 7 is an interface for input to the information processing device 100 or output from the information processing device 100. The I/O interface 7 is connected to the keyboard 12 and the display 15, and receives information input by the user by operating the keyboard 12.

The reader/writer (R/W) device 8 detachably attaches an external storage medium 13 and reads or writes a program and/or data from or to the attached storage medium.

The keyboard 12 receives an input including an instruction to the information processing device 100 from the user. In order to receive the input, the information processing device 100 may include other devices such as a mouse. Hereinafter, the keyboard 12 and the mouse are also collectively referred to as an input part.

The display 15 outputs a processing result of the information processing device 100. The display 15 includes a liquid-crystal display (LCD) or an organic electroluminescence (EL) display, and displays a video or image according to a video signal or an image signal output from the information processing device 100. The display 15 displays, for example, the first display screen 111 shown in FIG. 5.

[Designation of Connection Relationship Between Components]

Figure 5:
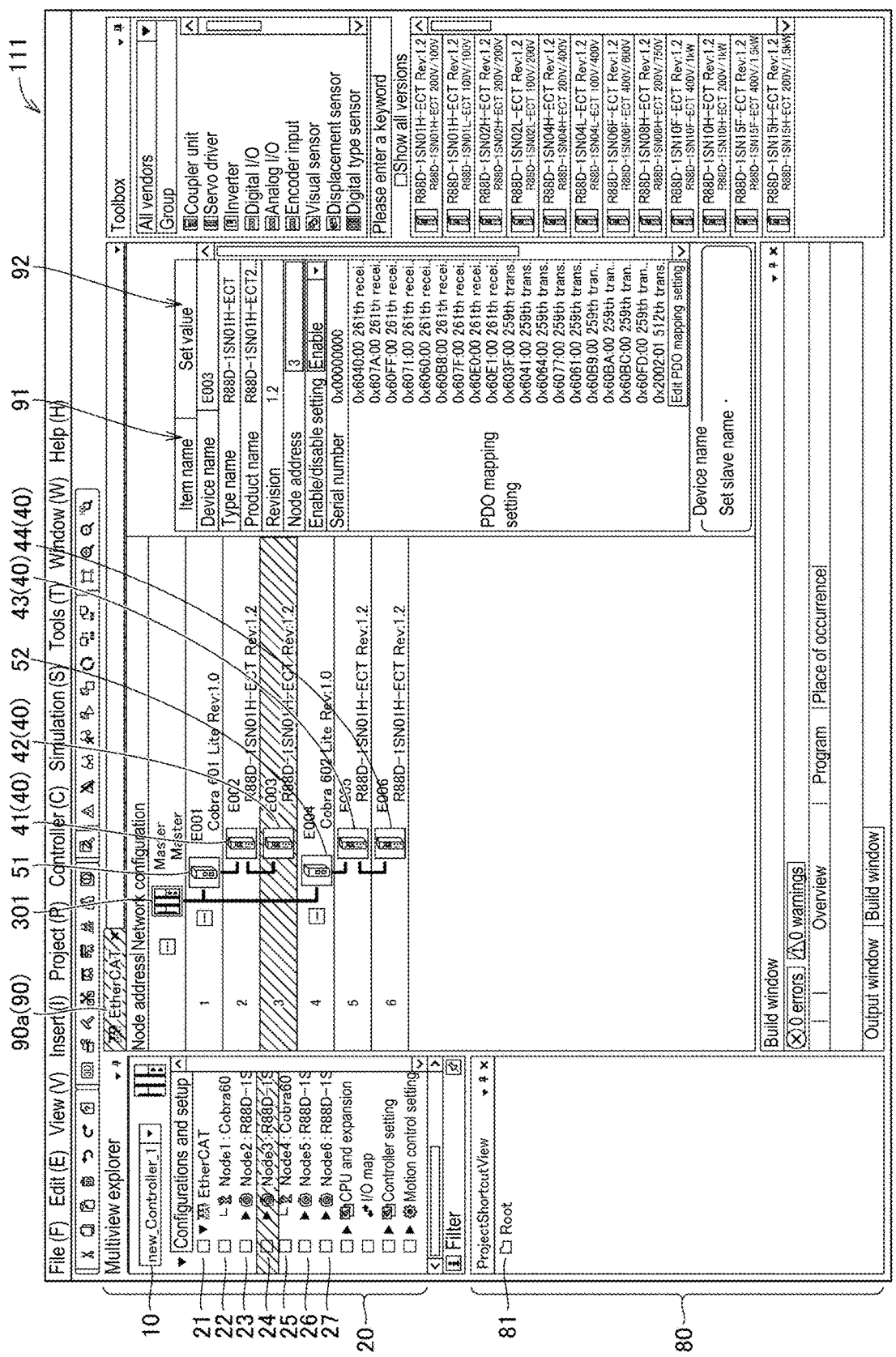
FIG. 5 describes designation of a connection relationship between components.

FIG. 5 describes designation of a connection relationship between components. Referring to FIG. 5, the designation reception part 101 displays the first display screen 111 on the display 15 and receives a designation of a component. The component is designated by a user's operation of the input part. More specifically, the designation reception part 101 receives a designation of components corresponding to the Node1 reference item 22 to the Node6 reference item 27 included in the network setting category 21 as well as an electrical or mechanical connection relationship between these components. Device setting 10 included on the first display screen 111 indicates a device for which a connection relationship is to be set. In other words, the device setting 10 is an item that determines a device at the top level in a connection relationship between components. The device can be switched by operation of the input part operated by the user. For example, new_Controller1 shown in FIG. 5 shows that a set device is the robot controller 300.

When the designation reception part 101 receives the designation, the setting screen management part 102 selectively displays a setting screen prepared by component and by setting category on the display 15. When any reference item or component is selected by a user's operation of the input part, the setting screen management part 102 displays the network setting screen 90*a* including an item name 91 and a set value 92 of the setting of the component on the display 15. For example, when the Node3 reference item 24 is selected, the setting screen management part 102 displays the network setting screen 90*a* including the item name 91 and the set value 92 on the display 15. The item name 91 is composed of, for example, a "device name" and a "serial number" of the driver component 42. The set value 92 is composed of, for example, "E003" corresponding to the "device name" and "3" corresponding to a "node address." The "node address" indicates an address of each component in the network NW.

The setting screen management part 102 associates the robot component 51 corresponding to the robot 501*a* and the robot component 52 corresponding to the robot 501*b* with a component 301 corresponding to the robot controller 300 on a screen within the network setting screen 90*a* that is different from (for example, adjacent to) the screen of the item name 91 and the set value 92, and displays the same on the display 15.

More specifically, the setting screen management part 102 associates the driver component 41 corresponding to the servo driver 401 and the driver component 42 corresponding to the servo driver 402 with the robot component 51 on this different screen, and displays the same on the display 15. The robot component 51 corresponds to the robot 501*a*. The setting screen management part 102 associates the driver component 43 corresponding to the servo driver 403 and the driver component 44 corresponding to the servo driver 404 with the robot component 52 and displays the same on the display 15. The robot component 52 corresponds to the robot 501*b*.

The reference item management part 103, for example, displays the Node1 reference item 22 to the Node6 reference item 27 under the network setting category 21 of the MVE 20. The reference item management part 103, for example, associates the network setting screen 90*a* with the Node1 reference item 22 to the Node6 reference item 27, and selectively displays the same on the display 15 according to user settings.

[Robot Setting Screen 90*b*]

Figure 6:
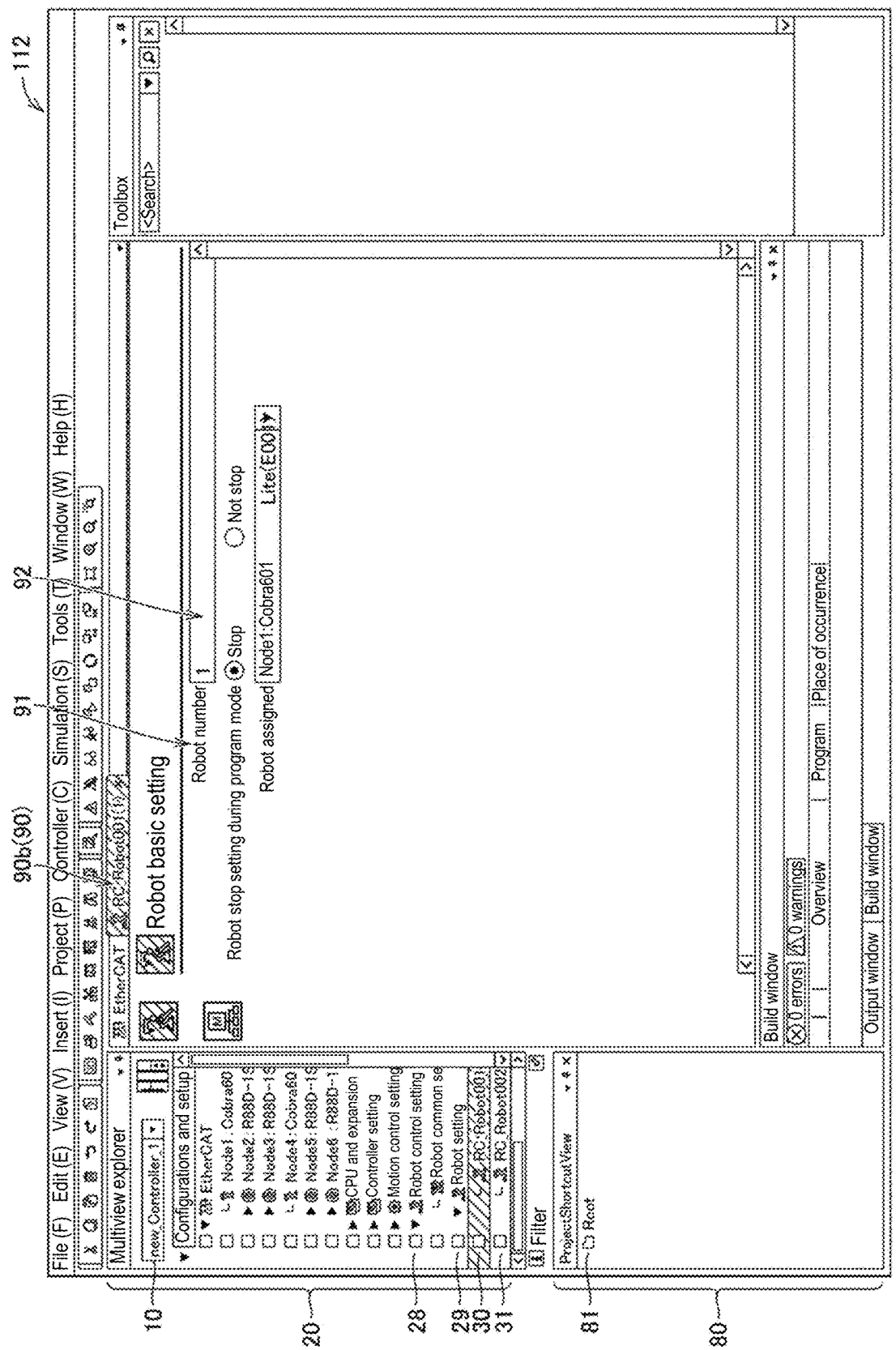
FIG. 6 shows a second display screen 112 including a robot setting screen 90b.

FIG. 6 shows the second display screen 112 including the robot setting screen 90*b*. Referring to FIG. 6, the designation reception part 101 displays the second display screen 112 on the display 15 and receives a designation of a component by a user's operation of the input part. More specifically, the designation reception part 101 receives a designation of a component corresponding to each of the Robot001 reference item 30 and the Robot002 reference item 31 included in the robot setting category 29 under the robot control setting category 28 as well as an electrical or mechanical connection relationship between these components. The robot setting screen 90*b* is associated with the Robot001 reference item 30.

The setting screen management part 102 displays the robot setting screen 90*b* including the item name 91 and the set value 92 on the display 15. The item name 91 is composed of a "robot number," a "robot assigned", and the like of the component corresponding to the robot 501*a*. The set value 92 is composed of "1" corresponding to the "robot number" and "node 1" corresponding to the "robot assigned." By setting "node 1" for the "robot assigned," an address "node 1" is set for the robot component 51 corresponding to the robot 501*a* whose "robot number" is "1."

The reference item management part 103, for example, displays the Robot001 reference item 30 and the Robot002 reference item 31 under the robot setting category 29. The reference item management part 103 associates the robot setting screen 90*b* with the Robot001 reference item 30, and selectively displays the same on the display 15. The robot setting screen 90*b* is included on the second display screen 112. The reference item management part 103, for example, associates another setting screen different from the robot setting screen 90*b* with the Robot002 reference item 31, and selectively displays the same on the display 15.

[Robot Details Setting Screen 90*c*]

Figure 7:
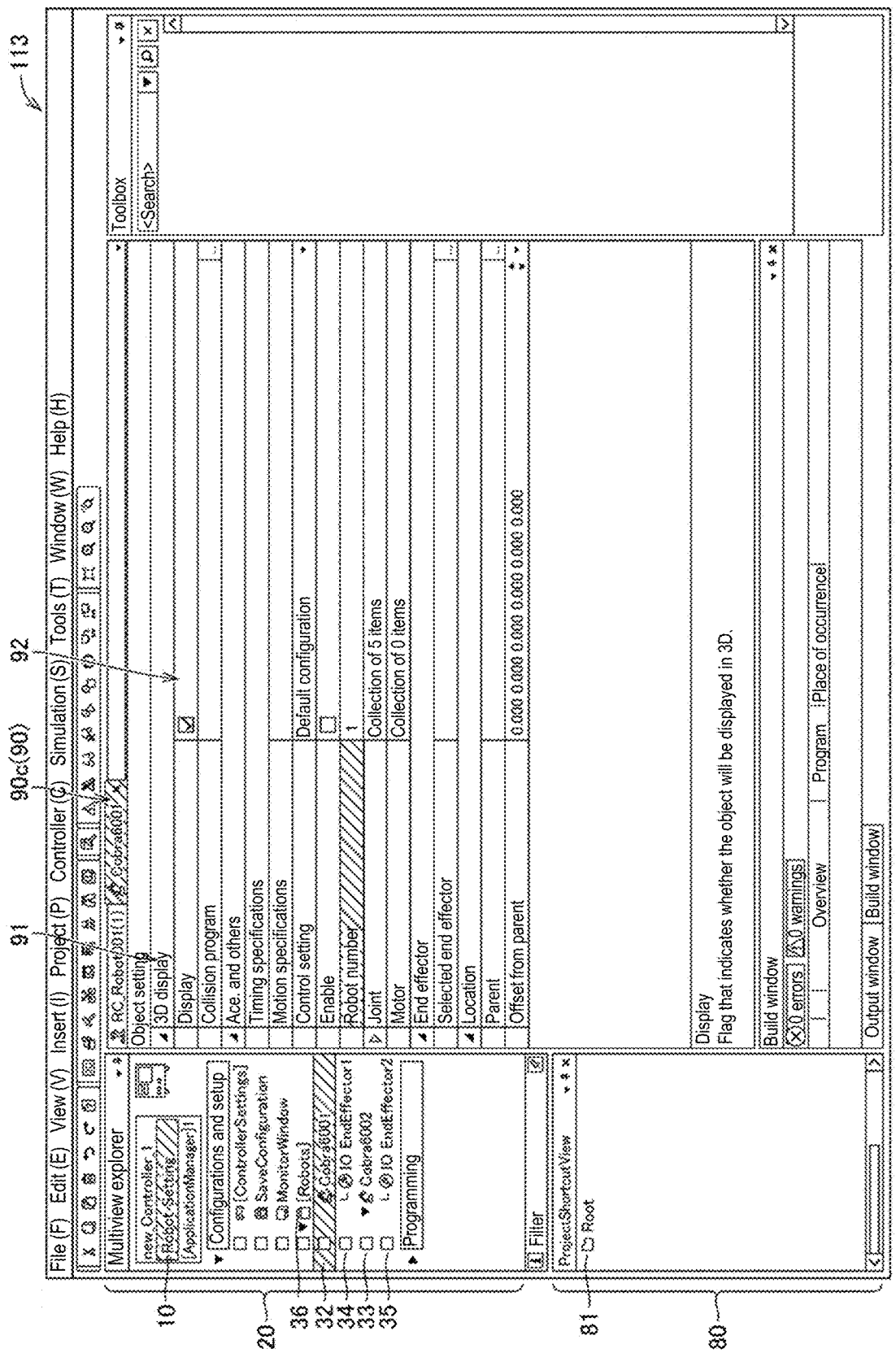
FIG. 7 shows a third display screen 113 including a robot details setting screen 90c.

FIG. 7 shows the third display screen 113 including the robot details setting screen 90*c*. Referring to FIG. 7, the designation reception part 101 displays the third display screen 113 on the display 15 and receives a designation of a component by a user's operation of the input part. The robot details setting screen 90*c* is associated with the Cobra6001 reference item 32.

The designation reception part 101 receives a designation of a component corresponding to each of the Cobra6001 reference item 32 and the Cobra6002 reference item 33 as well as an electrical or mechanical connection relationship between these components. The Cobra6001 reference item 32 and the Cobra6002 reference item 33 are included in a robot body setting category 36. In FIG. 7, the content of the device setting 10 is changed from new_Controller1 to RobotSetting. This indicates that the device has been changed from the robot controller 300 to the robot 501. For example, the robot 501 has been set as the device at the top level.

By a user's operation, the setting screen management part 102 displays the item name 91 including the "robot number" of the component corresponding to the robot 501a and the set value 92 including "1" corresponding to the "robot number" on the display 15.

The reference item management part 103, for example, displays the Cobra6001 reference item 32 and the Cobra6002 reference item 33 under the robot body setting category 36. The reference item management part 103 associates the robot details setting screen 90c with the Cobra6001 reference item 32, and selectively displays the same on the display 15. The robot details setting screen 90c is included on the third display screen 113. The reference item management part 103, for example, associates another setting screen different from the robot details setting screen 90c with the Cobra6002 reference item 33, and selectively displays the same on the display 15.

The EndEffector1 reference item 34 is displayed under the Cobra6001 reference item 32. The EndEffector2 reference item 35 is displayed under the Cobra6002 reference item 33. The EndEffector1 reference item 34 is a reference item of a component corresponding to the end effector 502a having an electrical or mechanical connection relationship with the component corresponding to the robot 501a. The EndEffector2 reference item 35 is a reference item of a component corresponding to the end effector 502b having an electrical or mechanical connection relationship with a component corresponding to the robot 501b.

Figure 8:
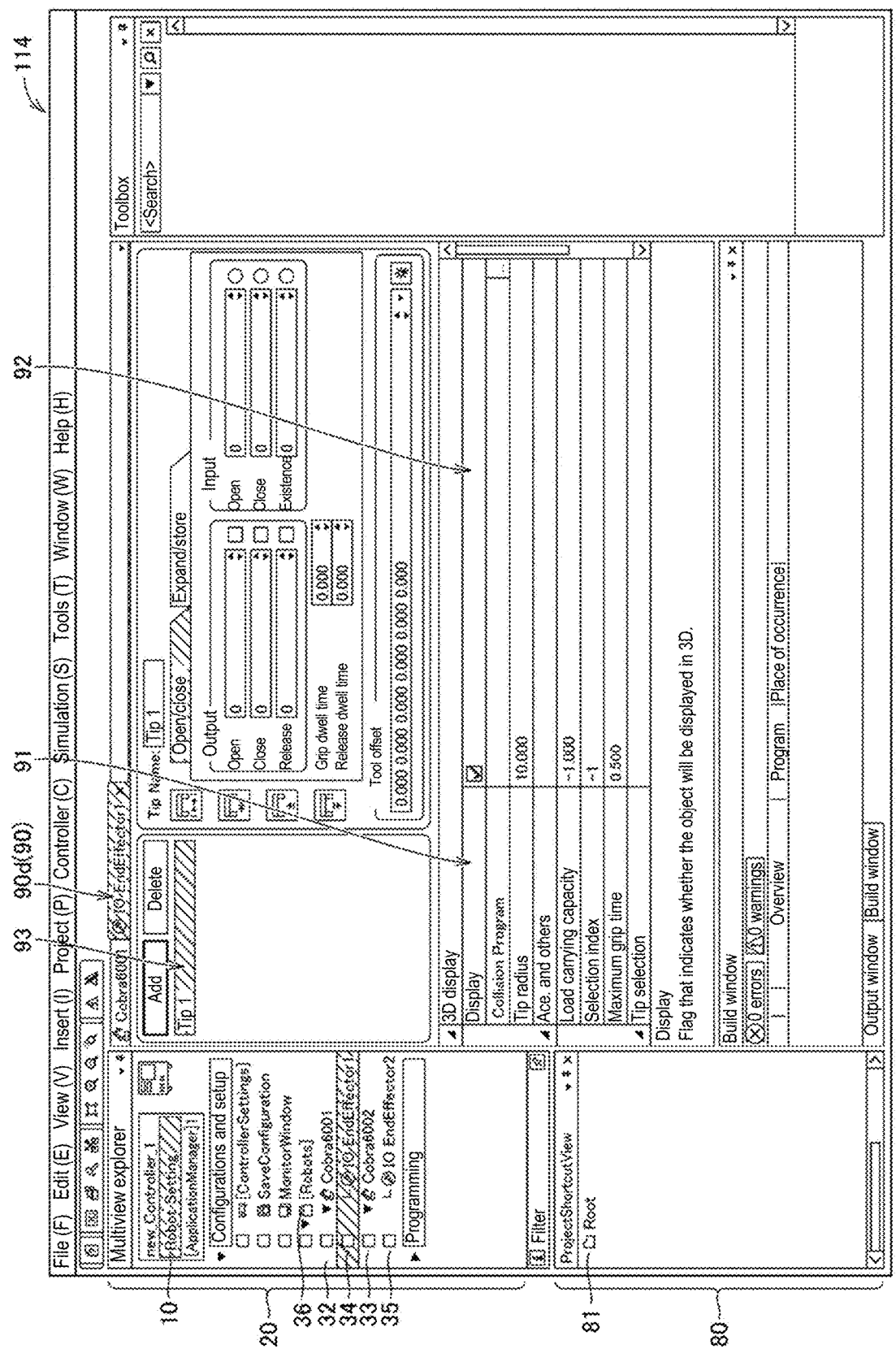
FIG. 8 shows a fourth display screen 114 including an end effector setting screen 90d.

FIG. 8 shows the fourth display screen 114 including the end effector setting screen 90d. Referring to FIG. 8, the designation reception part 101 displays the fourth display screen 114 on the display 15 and receives a designation of a component by a user's operation of the input part. The end effector setting screen 90d is associated with the EndEffector1 reference item 34.

The designation reception part 101 receives a designation of a component corresponding to the EndEffector1 reference item 34 and a component corresponding to the EndEffector2 reference item 35 as well as an electrical or mechanical connection relationship between these components. The EndEffector1 reference item 34 is provided under the Cobra6001 reference item 32. The EndEffector2 reference item 35 is provided under the Cobra6002 reference item 33.

The setting screen management part 102 displays "tip 1" as a set value 93 corresponding to the EndEffector1 reference item 34 on the display 15. The setting screen management part 102 displays "tip 2" as the set value 93 corresponding to the EndEffector2 reference item 35 on the display 15. Accordingly, for example, the robot number "1" in the robot 501a is associated with the set value "tip 1" of the end effector 502a electrically or mechanically connected to the robot 501a. For example, a robot number "2" in the robot 501b is associated with the set value "tip 2" of the end effector 502b electrically or mechanically connected to the robot 501b.

[Axis Setting Screen 90e]

Figure 9:
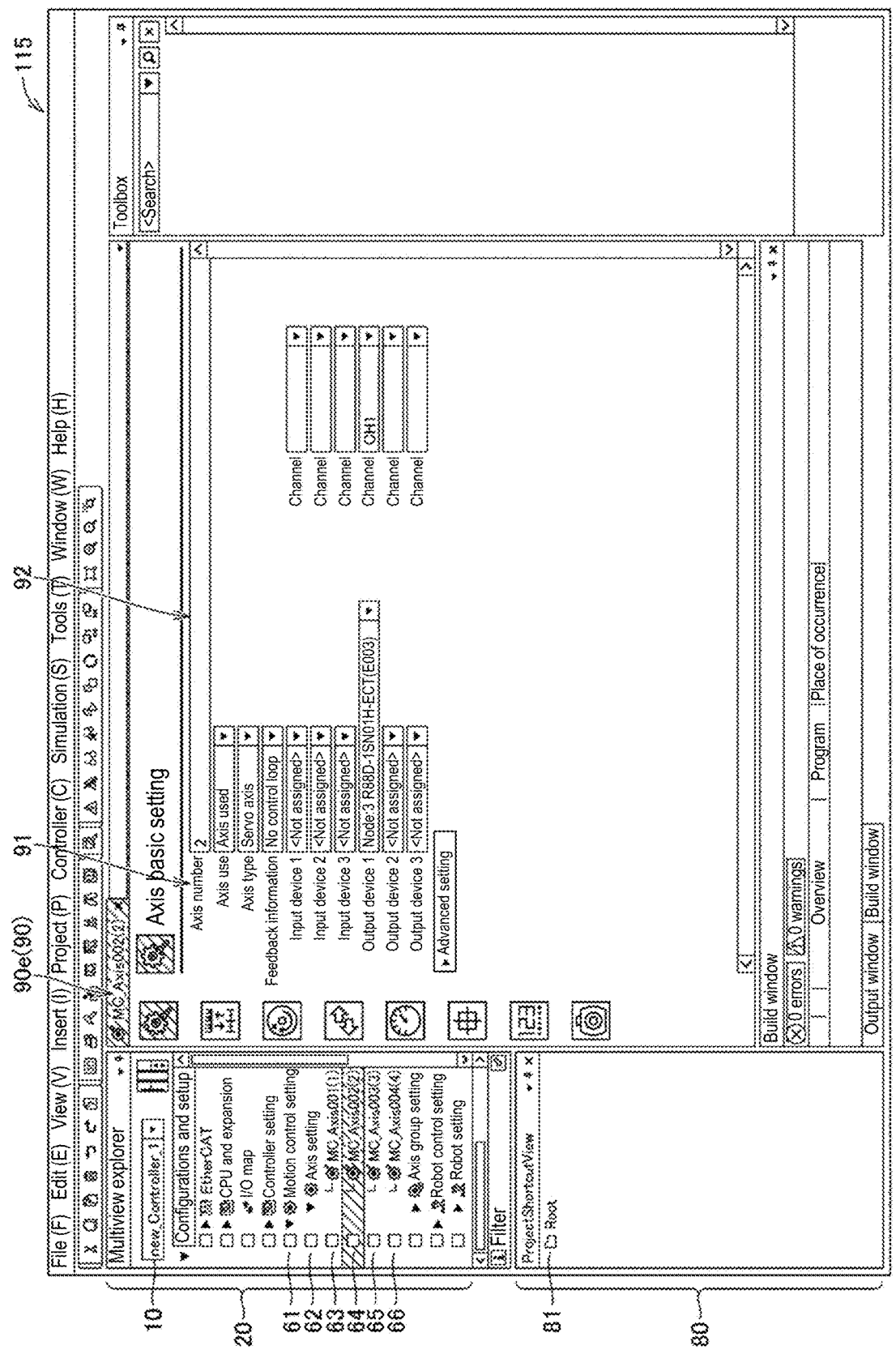
FIG. 9 shows a fifth display screen 115 including an axis setting screen 90e.

FIG. 9 shows the fifth display screen 115 including the axis setting screen 90e. Referring to FIG. 9, the designation reception part 101 displays the fifth display screen 115 on the display 15 and receives a designation of a component by a user's operation of the input part. The axis setting screen 90e is associated with the Axis002 reference item 64.

The designation reception part 101 receives a designation of a component corresponding to each of the Axis001 reference item 63 to the Axis004 reference item 66 included in the axis setting category 62 as well as an electrical or mechanical connection relationship between these components. The axis setting category 62 is a category provided under the motion control setting category 61.

The setting screen management part 102 displays the item name 91 and the set value 92 on the display 15. The item name 91 includes, for example, an "axis number" and an "output device 1" of the component corresponding to the Axis002 reference item 64. The set value 92 includes, for example, "2" corresponding to "axis number" and "node 3" corresponding to the "output device 1." By setting "node 3" for the "output device 1," an address "node 3" is set for the driver component 42 corresponding to the servo driver 402 whose "axis number" is "2."

The reference item management part 103, for example, displays the Axis001 reference item 63 to the Axis004 reference item 66 under the axis setting category 62. The reference item management part 103 associates the axis setting screen 90e with the Axis002 reference item 64, and selectively displays the same on the display 15. The axis setting screen 90e is included on the fifth display screen 115. The reference item management part 103, for example, associates another setting screen different from the axis setting screen 90e with each of the other reference items 63, 65 and 66, and selectively displays the same on the display 15.

[Axis Group Setting Screen 90f]

Figure 10:
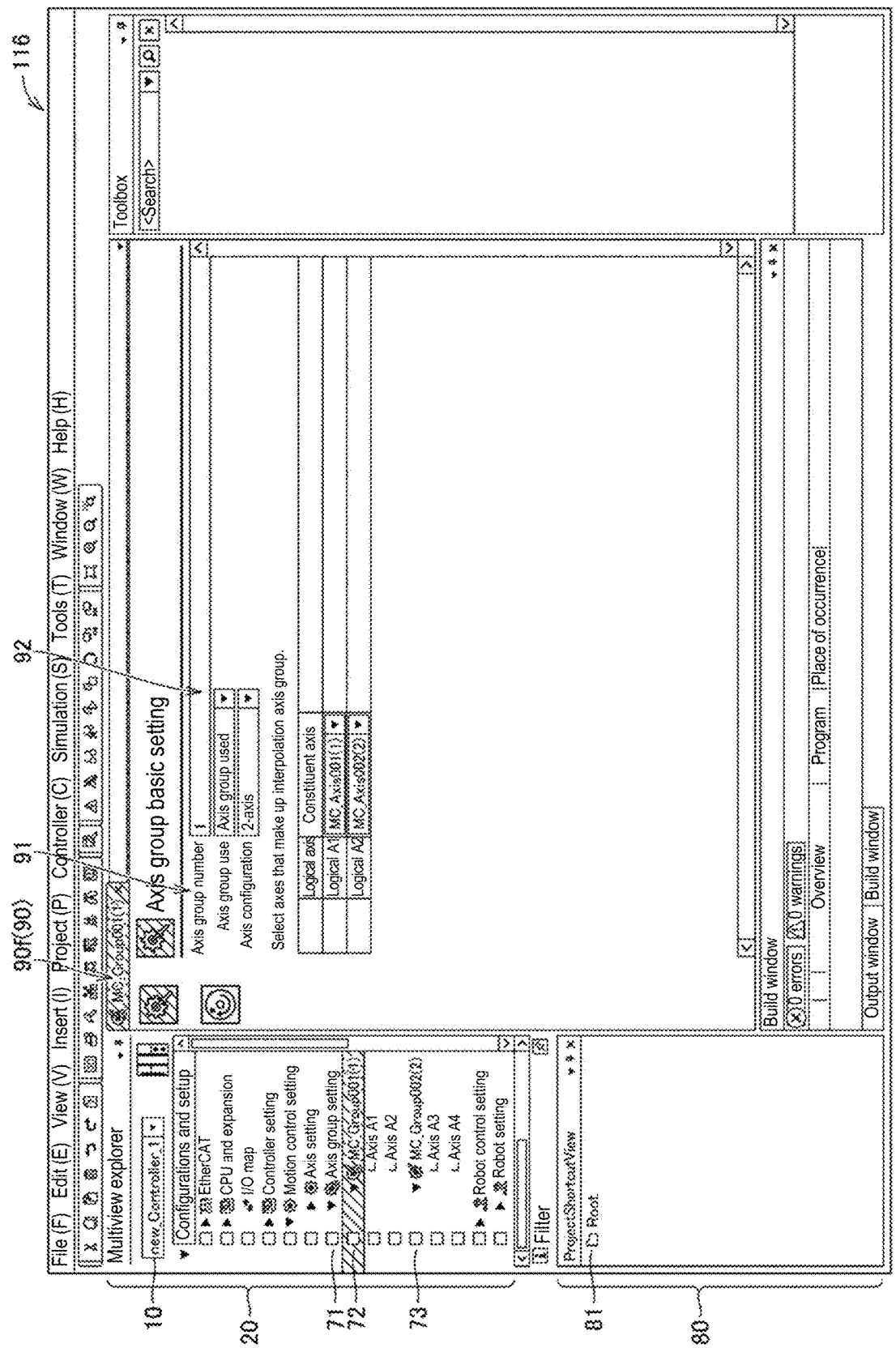
FIG. 10 shows a sixth display screen 116 including an axis group setting screen 90f.

FIG. 10 shows the sixth display screen 116 including the axis group setting screen 90f. Referring to FIG. 10, the designation reception part 101 displays the sixth display screen 116 on the display 15 and receives a designation of a component by a user's operation of the input part. The axis group setting screen 90f is associated with the Group001 reference item 72.

The designation reception part 101 receives a designation of a component corresponding to each of the Group001 reference item 72 and the Group002 reference item 73 as well as an electrical or mechanical connection relationship between these components. The Group001 reference item 72 and the Group002 reference item 73 are included in the axis group setting category 71.

The setting screen management part 102 displays the item name 91 and the set value 92 on the display 15. The item name 91 includes, for example, an "axis group number" and a "constituent axis" of the component corresponding to the Group001 reference item 72. The set value 92 includes, for example, "1" corresponding to the "axis group number" and "Axis001" and "Axis002" corresponding to the "constituent axis." By setting "Axis001" and "Axis002" for the "configuration axis," an axis group number "1" is set for the driver component 41 and the driver component 42. The driver component 41 corresponds to the servo driver 401 in which "1" is set for the "axis number." The driver component 42 corresponds to the servo driver 402 in which "2" is set for the "axis number."

The reference item management part 103, for example, displays the Group001 reference item 72 and the Group002 reference item 73 under the axis group setting category 71. The reference item management part 103 associates the axis group setting screen 90f with the Group001 reference item 72, and selectively displays the same on the display 15. The axis group setting screen 90f is included on the sixth display screen 116. The reference item management part 103 associates another setting screen different from the axis group setting screen 90f with the Group002 reference item 73, and selectively displays the same on the display 15.

[Collective Processing]

Next, a description is given of the fact that the collective management part 104 duplicates and collectively displays reference items. The collective management part 104 receives a selection, by a user's operation, of any of the reference items associated with the setting screen 90 by the reference item management part 103.

Figure 11:
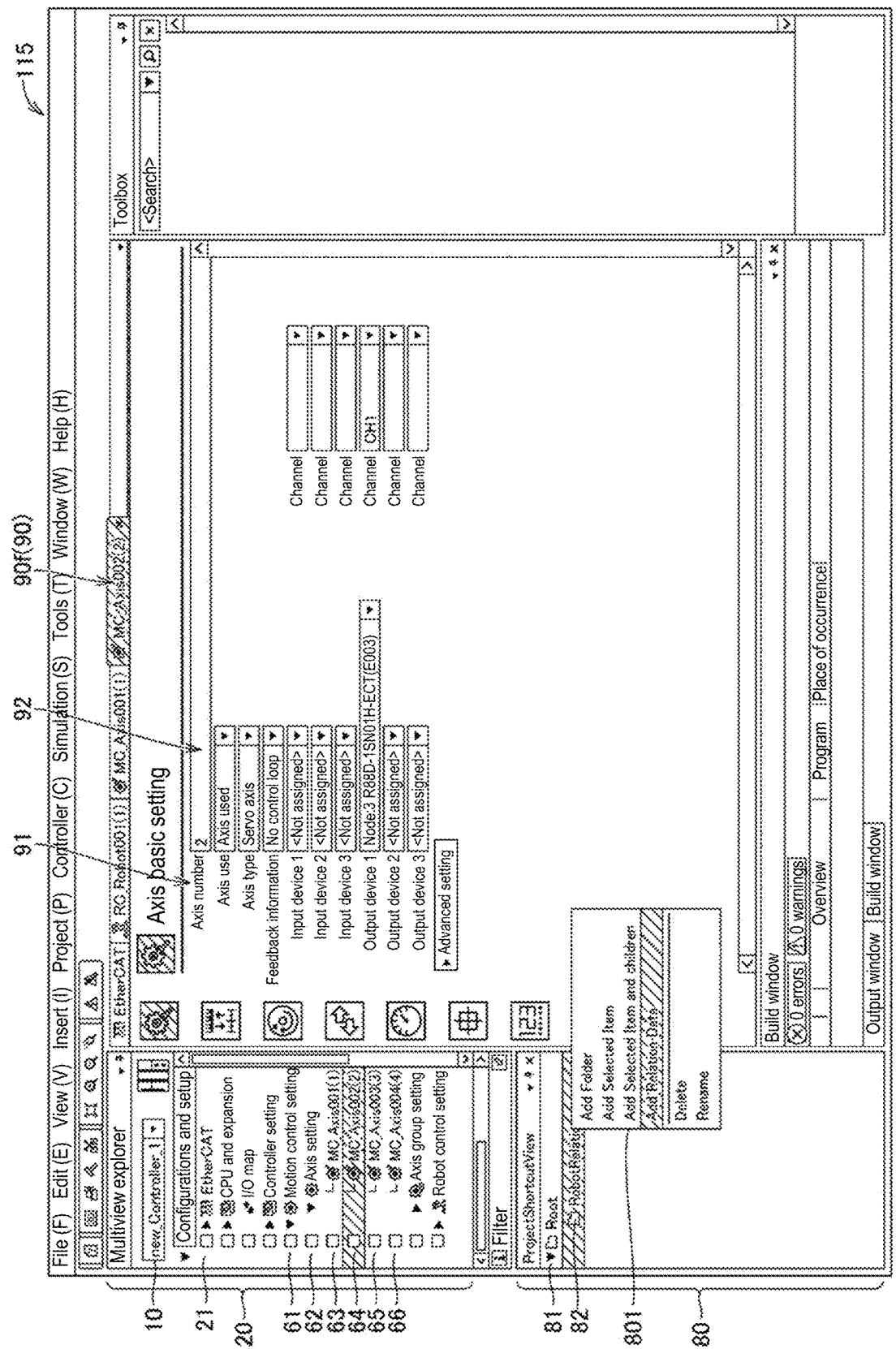
FIG. 11 describes reception of a selection of a reference item.

FIG. 11 describes reception of a selection of a reference item. Referring to FIG. 11, the collective management part 104 receives, for example, a selection of the Axis002 reference item 64 by a user's operation of the input part. The collective management part 104 receives a user's operation of the input part and creates the RobotRelation folder 82 under the Root folder 81 of the PSV 80.

When AddRelationData shown on a selection screen 801 is selected by a user's operation of the input part and processing related to the AddRelationData is executed, the collective management part 104 duplicates a reference item associated with a setting screen belonging to another setting category related to a component to be set by the setting screen 90 associated with the selected reference item. For example, the selected reference item is the Axis002 reference item 64, and the setting screen associated with the reference item is the axis setting screen 90*e*. The another setting category is the network setting category 21, and the collective management part 104 duplicates the Node3 reference item 24 associated with the network setting screen 90*a* belonging to the network setting category 21.

The collective management part 104 duplicates the Robot001 reference item 30 associated with the robot setting screen 90*b* for setting the robot component 51 electrically or mechanically connected to the driver component 42. The driver component 42 is a component to be set by the axis setting screen 90*e* associated with the selected Axis002 reference item 64.

Figure 12:
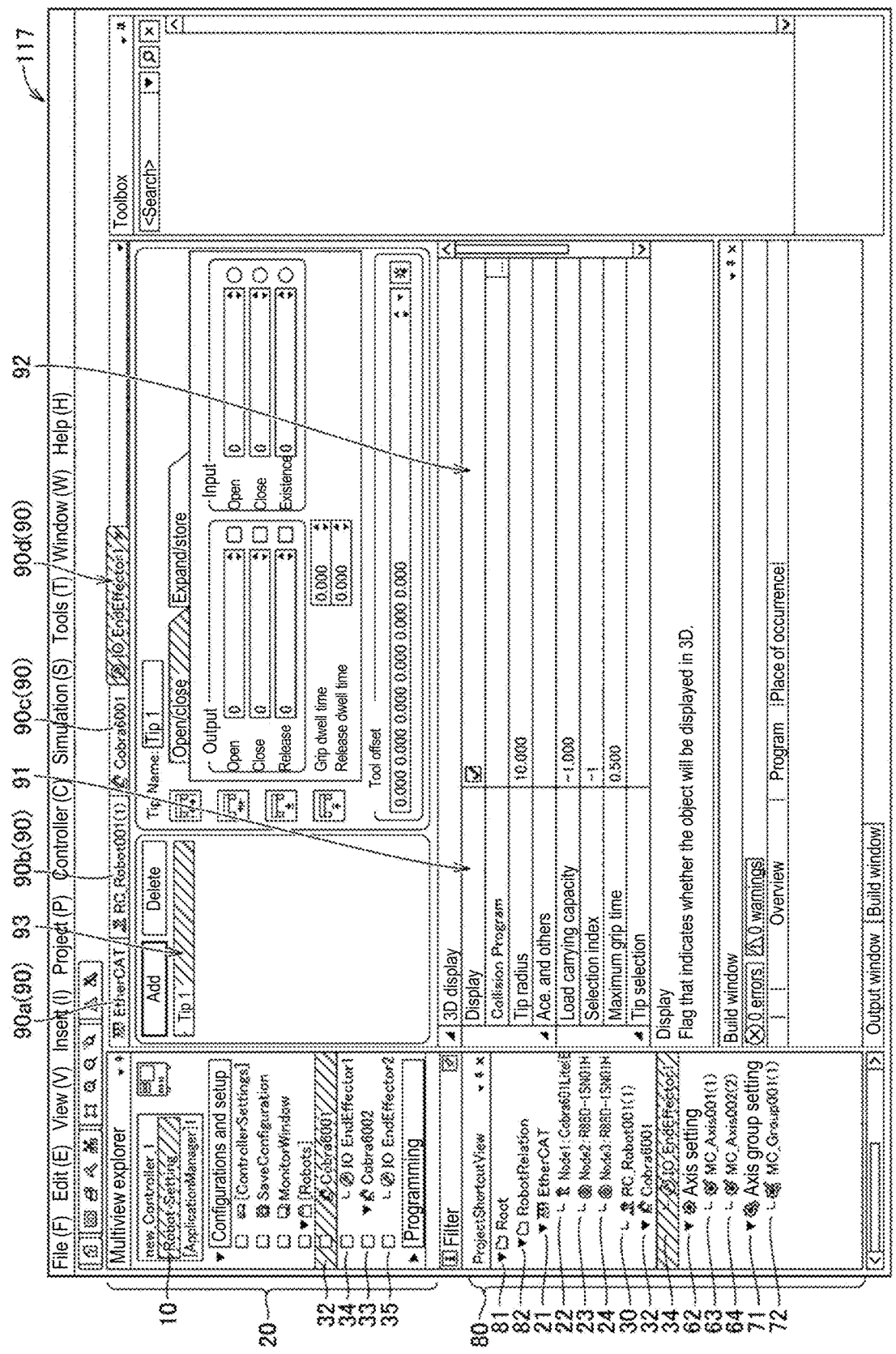
FIG. 12 shows an example in which duplicated reference items are collectively displayed in a PSV 80.

FIG. 12 shows an example in which duplicated reference items are collectively displayed in the PSV 80. The collective management part 104 collectively displays the duplicated reference items. More specifically, the collective management part 104 duplicates and collectively displays each reference item related to the selected reference item in the RobotRelation folder 82. In other words, the collective management part 104 stores a reference item containing a path of a file of the setting screen 90 in the RobotRelation folder 82.

Due to selection of the Axis002 reference item 64, the collective management part 104 duplicates and collectively displays, for example, the Node1 reference item 22 to the Node3 reference item 24. Due to selection of the Axis002 reference item 64, the collective management part 104 duplicates and collectively displays, for example, the Robot001 reference item 30, the Cobra6001 reference item 32 and the EndEffector1 reference item 34. Further, due to selection of the Axis002 reference item 64, the collective management part 104 duplicates and collectively displays, for example, the Axis001 reference item 63 and the Group001 reference item 72. Accordingly, in the information processing device 100, settings related to those for each setting category in at least one of a selected component and another component related to the selected component can be easily extracted. More specifically, in the information processing device 100, another reference item related to a certain reference item can be easily extracted. Therefore, the information processing device 100 may reduce the working time of the user.

[Processing Procedure of Information Processing Device 100]

Figure 13:
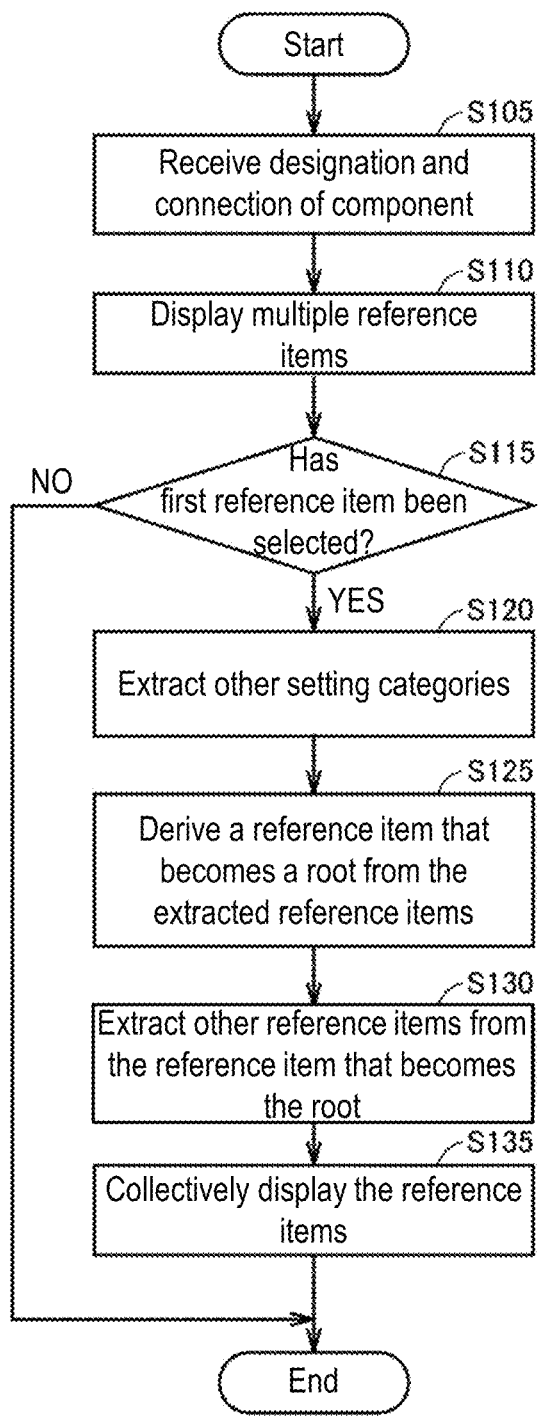
FIG. 13 is a flowchart describing collective display processing executed by a processor 2.

Referring to FIG. 13, a control structure of the processor 2 in the information processing device 100 is described. The control in FIG. 13 is realized, for example, by the processor 2 executing the control program 9. FIG. 13 is a flowchart describing collective display processing executed by the processor 2. In step S105, the processor 2 receives a designation of one or multiple components as well as an electrical or mechanical connection relationship between the components. The processor 2 selectively displays the setting screen 90 prepared by component and by setting category for receiving settings for each component included in a control system built according to the designation.

In step S110, the processor 2 displays multiple reference items associated with any of the setting screen 90 and for selectively displaying the associated setting screen 90 according to user settings.

In step S115, the processor 2 determines whether a first reference item has been selected by a user's operation of an input part. If the first reference item has been selected (YES in step S115), the processor 2 switches the control to step S120. Otherwise (NO in step S115), the processor 2 ends the processing of the present flowchart.

In step S120, based on a setting category to which the first reference item belongs, the processor 2 extracts another setting category. Here, a method for extracting the another setting category is described with reference to FIG. 14 to FIG. 16.

Figure 14:
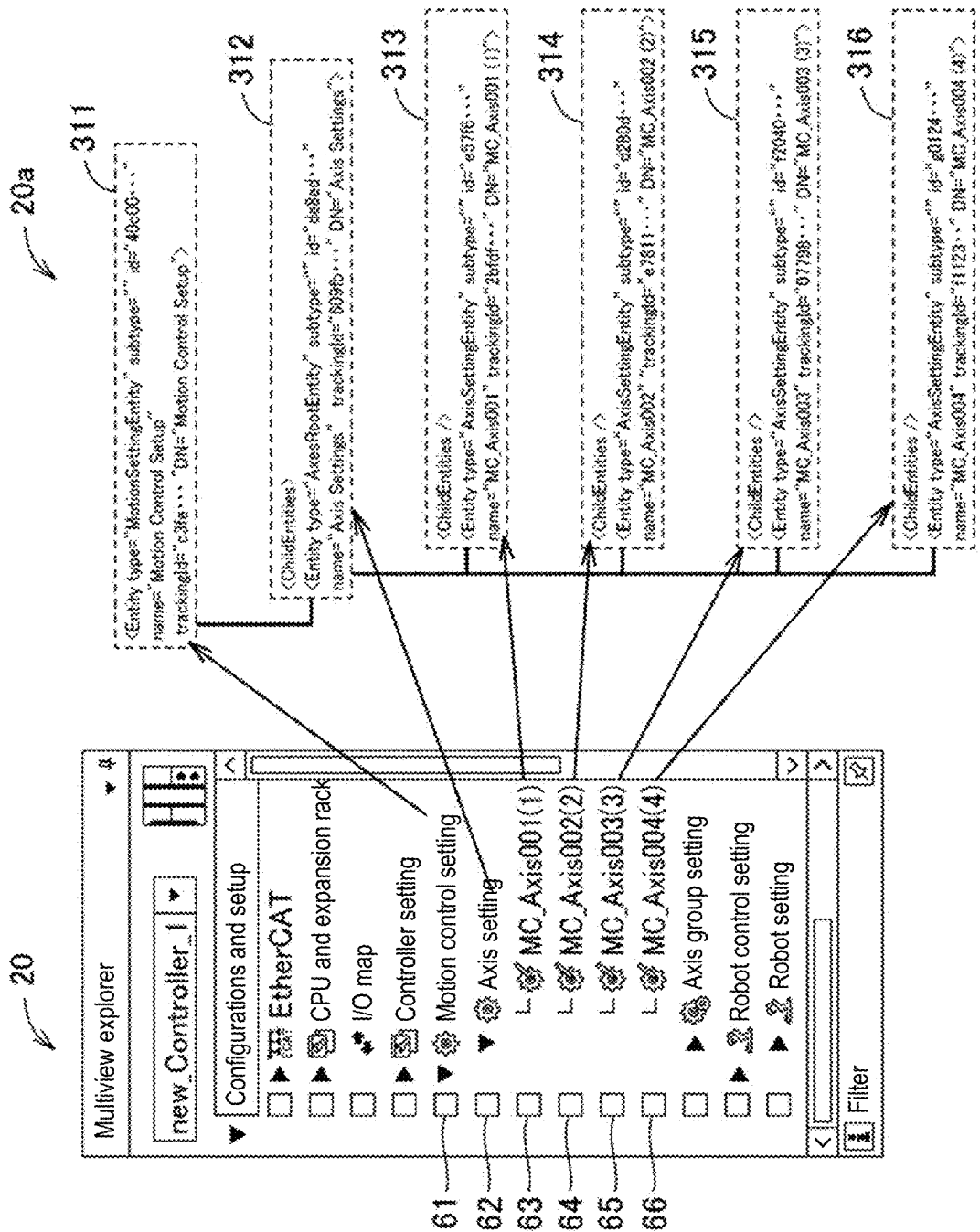

FIG. 14 shows a correspondence between the setting categories and reference items included in the MVE 20 and the code 20*a*. Referring to FIG. 14, the code 20*a* has a hierarchical structure, in which, for example, a code 311 is provided at the top level, and a code 312 is provided under the code 311. A code 313, a code 314, a code 315 and a code 316 are provided at the same level under the code 312. These codes are written in, for example, extensible markup language (XML), but may also be written in a language other than XML if the language can realize a setting category included in the MVE 20 as a reference item.

Each of the motion control setting category 61, the axis setting category 62, and the Axis001 reference item 63 to the Axis004 reference item 66 included in the MVE 20 corresponds to any of the code 311 to the code 316 included in the code 20*a*. More specifically, the motion control setting category 61 corresponds to the code 311. The axis setting category 62 corresponds to the code 312. The Axis001 reference item 63 corresponds to the code 313. The Axis002 reference item 64 corresponds to the code 314. The Axis003 reference item 65 corresponds to the code 315. The Axis004 reference item 66 corresponds to the code 316.

The code 311 corresponding to the motion control setting category 61 and the code 312 corresponding to the axis setting category 62 are predetermined codes. In contrast, the codes 313 to 315 corresponding to the Axis001 reference item 63 to the Axis004 reference item 66 under the axis setting category 62 are codes generated based on the user's designation of a connection relationship between the components or the like. In the code 20*a*, the codes corresponding to some of the setting categories and some of the reference items included in the MVE 20 are shown. However, other setting categories and other reference items included in the MVE 20 are also respectively described by codes such as XML. Relationships between each described code form a hierarchical structure. Like the motion control setting category 61, the other categories also become predetermined codes. The other reference items become codes generated based on the user's designation of a connection relationship between the components or the like.

Figure 15:
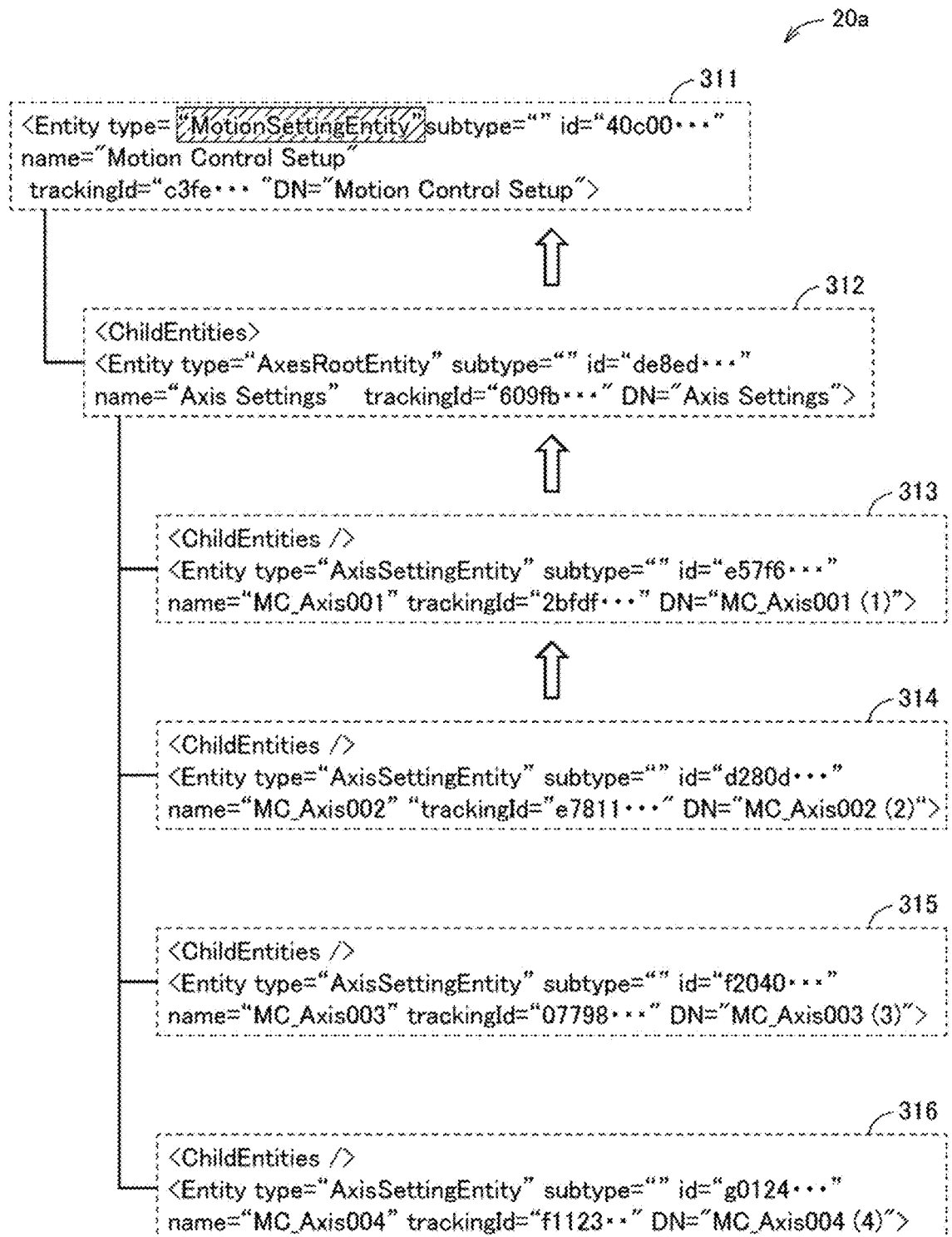

FIG. 15 is an enlarged view showing the content of the code 20*a*. Referring to FIG. 15, when the Axis002 reference item 64 is selected by a user's operation using the input part, the processor 2 extracts a setting category at an upper level than the code 314. More specifically, the processor 2 searches in the order of the code 313, the code 312, and the code 311 upper than the code 314, and extracts the motion control setting category 61 corresponding to the code 311 at the top level.

Next, the processor 2 extracts other setting categories at the same level as the motion control setting category 61. More specifically, the processor 2 extracts the network setting category 21 and the robot control setting category 28 and the like at the same level as the motion control setting category 61.

Figure 16:
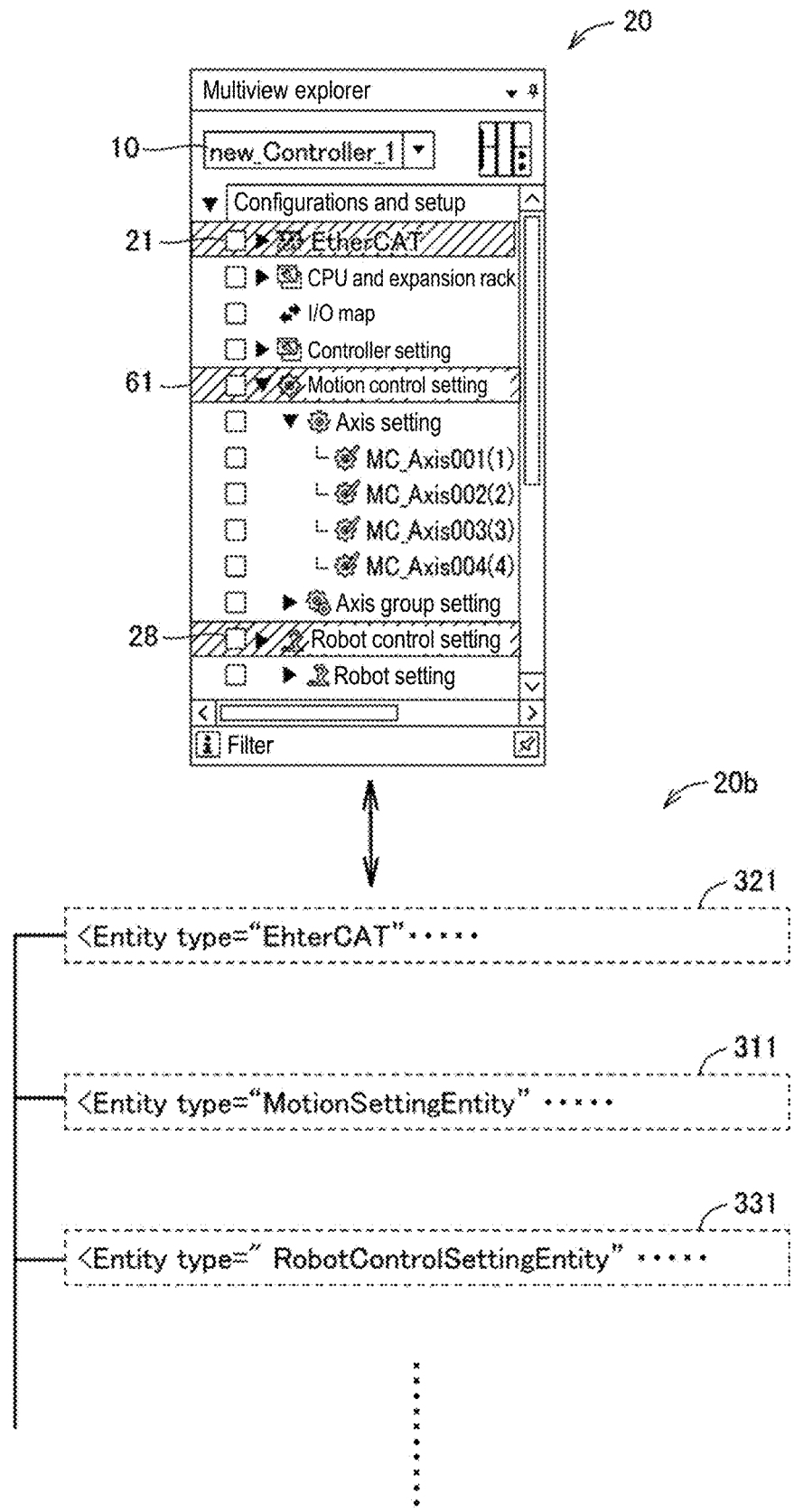
FIG. 16 shows one example of a code for displaying multiple setting categories included in the MVE 20.

FIG. 16 shows one example of a code for displaying multiple setting categories included in the MVE 20. A code 20b is a code for displaying multiple setting categories included in the MVE 20. Based on a code 321 of the network setting category 21 or the code 311 of the robot control setting category 28 at the same level as the code 311 of the motion control setting category 61 in the code 20b, the processor 2 extracts these setting categories. The multiple setting categories included in the code 20b are predetermined, for example, for each device.

In the case where one reference item is selected by a user's operation of the input part, the processor 2 extracts another setting category associated with the same device as that associated with a setting category to which the reference item belongs. The device in FIG. 16 is the robot controller 300 corresponding to new_Controller1 shown in the device setting 10. Therefore, the network setting category 21, the motion control setting category 61, and the robot control setting category 28 are categories associated with the robot controller 300.

For example, in the case where the network setting category 21 is extracted, the processor 2 duplicates and collectively displays, among one or multiple reference items included in the network setting category 21, the reference items related to the selected Axis002 reference item 64. For example, in the case where the robot control setting category 28 is extracted, the processor 2 duplicates and collectively displays, among one or multiple reference items included in the robot control setting category 28, the reference items related to the selected Axis002 reference item 64.

In this way, the processor 2 duplicates and collectively displays the reference items associated with the setting screen 90 belonging to another setting category associated with the same device as that associated with a setting category including the selected first reference item. That is, in the information processing device 100, before careful examination of the correspondence between each reference item, the setting categories for which a reference item is to be extracted are narrowed down by names of the setting categories. Accordingly, in the information processing device 100, only a setting category including a reference item related to the selected reference item can be taken as a target for extracting the reference item, and the reference item can be more easily extracted.

In step S125, the processor 2 derives from the extracted second reference item and third reference item, a reference item that becomes a predetermined root in the hierarchical structure. The reference item that becomes the predetermined root is a reference item that meets a certain condition, and the reference item that becomes the root can be changed by changing the condition. The processor 2 derives, for example, the Node1 reference item 22 upper than the Node3 reference item 24 of the servo driver 402 corresponding to the Axis002 reference item 64, as the root reference item.

In step S130, the processor 2 extracts from the root reference item another reference item related to the root reference item. More specifically, based on another set value set on the same setting screen 90 as a set value set on the setting screen 90 associated with the selected reference item, the processor 2 duplicates and collectively displays the reference items associated with another setting screen 90 where the another set value is set. Accordingly, in the information processing device 100, only a reference item relevant to the selected reference item can be extracted. The relevant reference item to be extracted is the reference item included in the setting category shown in FIG. 16 described above.

Figure 17:
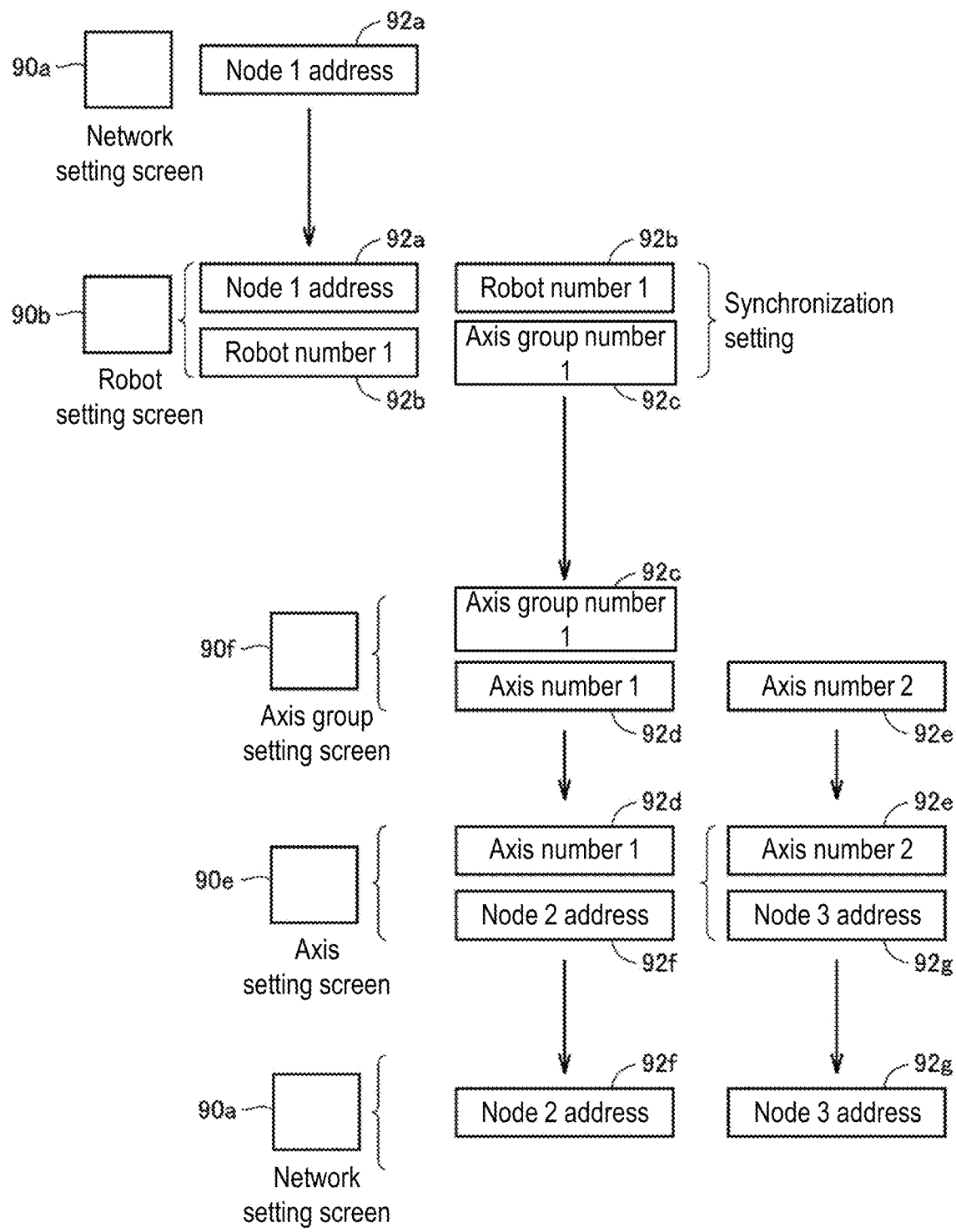
FIG. 17 describes extracting from a root reference item another reference item related to the root reference item.

FIG. 17 describes extracting from a root reference item another reference item related to the root reference item. The processor 2 searches for another set value associated with a set value 92a of a "node 1" address set for the robot component 51 on the network setting screen 90a. The network setting screen 90a is associated with the Node1 reference item 22. The Node1 reference item 22 is included in the network setting category 21. The processor 2 derives a set value 92b of a robot number "1" on the robot setting screen 90b. As a result, the processor 2 extracts the Node1 reference item 22 associated with the network setting screen 90a and the Robot001 reference item 30 associated with the robot setting screen 90b. The Robot001 reference item 30 is included in the robot setting category 29 under the robot control setting category 28.

Next, by associating the robot 501a with "robot number 1" with the servo driver 401 and the servo driver 402 in advance so that they operate in synchronization with each other, the processor 2 derives a set value 92c of "axis group number 1" on the axis group setting screen 90f. The processor 2 searches for another set value associated with the set value 92c of "axis group number 1." The processor 2 derives a set value 92d of "axis number 1" and a set value 92e of "axis number 2" on the fifth display screen 115 including the axis setting screen 90e. As a result, the processor 2 extracts the Group001 reference item 72 associated with the axis group setting screen 90f, and the Axis001 reference item 63 and the Axis002 reference item 64 associated with the fifth display screen 115 including the axis setting screen 90e. The Group001 reference item 72 is included in the axis group setting category 71 under the motion control setting category 61. The Axis001 reference item 63 and the Axis002 reference item 64 are included in the axis setting category 62 under the motion control setting category 61.

Further, the processor 2 searches for another set value associated with the set value 92d of "axis number 1." The processor 2 searches for another set value associated with the set value 92e of "axis group number 2." The processor 2 derives a set value 92f of a "node 2" address and a set value 92g of a "node 3" address on the network setting screen 90a. As a result, the processor 2 extracts the Node2 reference item 23 and the Node3 reference item 24 associated with the network setting screen 90a. The Node2 reference item 23 and the Node3 reference item 24 are included in the network setting category 21.

Referring again to FIG. 13, in step S135, the processor 2 duplicates the extracted reference items among multiple reference items belonging to each setting category of the MVE 20, and collectively displays the same on the display 15.

<Modifications>

In the present embodiment, the selected first reference item has been described as the Robot001 reference item 72 or the Axis002 reference item 64. In contrast, the selected first reference item may also be a reference item other than the above two reference items.

In the present embodiment, the selected first reference item has been described as one reference item. In contrast, the first reference item may also be multiple reference items.

In the present embodiment, the processor 2 has been described to associate the Node1 reference item 22 to the Node6 reference item 27 with one network setting screen 90a. In contrast, the processor 2 may associate the Node1 reference item 22 to the Node6 reference item 27 with separate setting screens 90.

In the present embodiment, it has been described that multiple setting categories included in the code 20b are predetermined, for example, for each device. In contrast, the multiple setting categories included in the code 20b may also be predetermined by multiple devices. For example, the multiple setting categories included in the code 20b may be predetermined across the robot controller 300 and the robot 501.

<Additional Remark>

As described above, the present embodiment includes the following disclosures.

[Configuration 1]

An information processing device (100) for building and setting up a control system (110) including one or multiple components, in which the information processing device includes:
- a reception part (101), receiving a designation of one or multiple components included in the control system (110) as a target as well as an electrical or mechanical connection relationship between the components;
- a setting screen processing part (102), selectively displaying a setting screen (90) prepared by component and by setting category for receiving settings for each component included in the control system (110) built according to the designation;
- a reference item processing part (103), displaying multiple reference items associated with any of the setting screen (90) and for selectively displaying the associated setting screen (90) according to user settings; and
- a collective processing part (104), duplicating and collectively displaying one or multiple reference items when a first reference item among the multiple reference items is selected, in which the duplicated and collectively displayed one or multiple reference items include at least one of a second reference item associated with a second setting screen belonging to another setting category related to the component to be set by a first setting screen associated with the selected first reference item, and a third reference item associated with a third setting screen for setting another component electrically or mechanically connected to the component to be set by the first setting screen associated with the selected first reference item.

[Configuration 2]

The information processing device as described in Configuration 1, in which the multiple reference items are arranged by setting category to which the setting screen (90) associated with each reference item belongs.

[Configuration 3]

The information processing device as described in Configuration 1 or 2, in which the collective processing part (104) duplicates and collectively displays the reference items associated with the setting screen (90) belonging to the another setting category related to the another component.

[Configuration 4]

The information processing device as described in any one of Configurations 1 to 3, in which the collective processing part (104) duplicates and collectively displays the reference items associated with the setting screen (90) belonging to another setting category associated with the same device as that associated with a setting category including the selected first reference item.

[Configuration 5]

The information processing device as described in any one of Configurations 1 to 4, in which, based on another set value set on the same setting screen (90) as a set value set on the setting screen (90) associated with the selected reference item, the collective processing part (104) duplicates and collectively displays the reference items associated with another setting screen (90) where the another set value is set.

[Configuration 6]

An information processing method for building and setting up a control system (110) including one or multiple components, in which the information processing method includes:
- a step (S105) of receiving a designation of one or multiple components included in the control system (110) as a target as well as an electrical or mechanical connection relationship between the components;
- a step (S105) of selectively displaying a setting screen (90) prepared by component and by setting category for receiving settings for each component included in the control system (110) built according to the designation;
- a step (S110) of displaying multiple reference items associated with any of the setting screen (90) and for selectively displaying the associated setting screen (90) according to user settings; and
- a step (S135) of duplicating and collectively displaying one or multiple reference items when a first reference item among the multiple reference items is selected, in which the duplicated and collectively displayed one or multiple reference items include at least one of a second reference item associated with a second setting screen belonging to another setting category related to the component to be set by a first setting screen associated with the selected first reference item, and a third reference item associated with a third setting screen for setting another component electrically or mechanically connected to the component to be set by the first setting screen associated with the selected first reference item.

[Configuration 7]

An information processing program, causing a computer to function as an information processing device (100) and build and set up a control system (110) including one or multiple components, in which the information processing program causes the computer to execute:
- a step (S105) of receiving a designation of one or multiple components included in the control system (110) as a target as well as an electrical or mechanical connection relationship between the components;
- a step (S105) of selectively displaying a setting screen prepared by component and by setting category for receiving settings for each component included in the control system built according to the designation;
- a step (S110) of displaying multiple reference items associated with any of the setting screen (90) and for selectively displaying the associated setting screen (90) according to user settings; and a step (S135) of duplicating and collectively displaying one or multiple reference items when a first reference item among the multiple reference items is selected, in which the duplicated and collectively displayed one or multiple reference items include at least one of a second reference item associated with a second setting screen belonging to another setting category related to the component to be set by a first setting screen associated with the selected first reference item, and a third reference item associated with a third setting screen for setting another component electrically or mechanically connected to the component to be set by the first setting screen associated with the selected first reference item.

The embodiments disclosed herein are examples in all aspects and should not be interpreted as limitations. The scope of the present invention is indicated by claims instead of the above description, and it is intended to include all modifications within the scope of the claims and the equivalents thereof.

What is claimed is:

1. An information processing device for building and setting up a graphical user interface for a control system comprising a plurality of real machines, wherein the information processing device comprises:
   a reception part, receiving a designation of a plurality of components as target components on the graphical user interface, wherein the designation comprises a connection relationship between the plurality of real machines, wherein the plurality of real machines are corresponding to the plurality of components;
   a setting screen processing part, selectively displaying a plurality of setting screens on the graphical user interface for receiving settings for the plurality of components, wherein the plurality of setting screens are prepared based on a plurality of setting categories;
   a reference item processing part, displaying a plurality of reference items, wherein the plurality of reference items are icons on the graphical user interface for displaying the plurality of setting screens on the graphical user interface according to an input signal, the input signal comprises an instruction from a user, and the plurality of reference items are comprised in the plurality of setting categories; and
   a collective processing part, displaying a first reference item, a second reference item, and a third reference item among the plurality of reference items together on the graphical user interface when the first reference item is selected according to the input signal,
   wherein the first reference item is associated with a first setting screen and belongs to a first setting category,
   the second reference item is associated with and duplicated from a second setting screen and belongs a second setting category, the second setting category is related to a first component to be set by the first setting screen,
   the third reference item is associated with and duplicated from a third setting screen, and
   the third setting screen is for setting a related component connected to the first component.

2. The information processing device according to claim 1, wherein the plurality of reference items are arranged by setting category to which one of the plurality of the setting screens associated with each reference item belongs.

3. The information processing device according to claim 1, wherein the collective processing part displays the plurality of reference items associated with the plurality of setting screens belonging to the second setting category.

4. The information processing device according to claim 1, wherein the collective processing part displays the plurality of reference items associated with the plurality of setting screens belonging to second setting category associated with a same device as a device associated with the first setting category.

5. The information processing device according to claim 1, wherein, based on another set value set on the first setting screen, the collective processing part displays the plurality of reference items associated with the first setting screen where the another set value is set.

6. An information processing method for building and setting up a graphical user interface for a control system comprising a plurality of real machines, wherein the information processing method comprises:
   receiving a designation of a plurality of components as target components on the graphical user interface, wherein the designation comprises a connection relationship between the plurality of real machines, wherein the plurality of real machines are corresponding to the plurality of components;
   selectively displaying a plurality of setting screens on the graphical user interface for receiving settings for the plurality of components, wherein the plurality of setting screens are prepared based on a plurality of setting categories;
   displaying a plurality of reference items, wherein the plurality of reference items are icons on the graphical user interface for displaying the plurality of setting screens on the graphical user interface according to an input signal, the input signal comprises an instruction from a user, and the plurality of reference items are comprised in the plurality of setting categories; and
   displaying a first reference item, a second reference item, and a third reference item among the plurality of reference items together on the graphical user interface when the first reference item is selected according to the input signal,
   wherein the first reference item is associated with a first setting screen and belongs to a first setting category,
   the second reference item is associated with and duplicated from a second setting screen and belongs a second setting category,
   the second setting category is related to a first component to be set by the first setting screen,
   the third reference item is associated with and duplicated from a third setting screen, and
   the third setting screen is for setting a related component connected to the first component.

7. A non-transitory computer readable medium storing an information processing program, the information processing program causing a computer to function as an information processing device and build and set up a graphical user interface for a control system comprising a plurality of real machines, wherein the information processing program causes the computer to execute:
   receiving a designation of a plurality of components as target components on the graphical user interface, wherein the designation comprises a connection relationship between the plurality of real machines, wherein the plurality of real machines are corresponding to the plurality of components;
   selectively displaying a plurality of setting screens on the graphical user interface for receiving settings for the plurality of components, wherein the plurality of setting screens are prepared based on a plurality of setting categories;

displaying a plurality of reference items, wherein the plurality of reference items are icons on the graphical user interface for displaying the plurality of setting screens on the graphical user interface according to an input signal, the input signal comprises an instruction from a user, and the plurality of reference items are comprised in the plurality of setting categories; and displaying a first reference item, a second reference item, and a third reference item among the plurality of reference items together on the graphical user interface when the first reference item is selected according to the input signal, wherein the first reference item is associated with a first setting screen and belongs to a first setting category, the second reference item is associated with and duplicated from a second setting screen and belongs a second setting category the second setting category is related to a first component to be set by the first setting screen, the third reference item is associated with and duplicated from a third setting screen, and the third setting screen is for setting a related component connected to the first component.

* * * * *